(12) United States Patent
Stefansson et al.

(10) Patent No.: US 9,871,697 B2
(45) Date of Patent: *Jan. 16, 2018

(54) DYNAMIC DEFINITION FOR CONCURRENT COMPUTING ENVIRONMENTS

(71) Applicant: The MathWorks, Inc., Natick, MA (US)

(72) Inventors: Halldor Narfi Stefansson, Natick, MA (US); Elwin Yam Ming Chan, Cambridgeshire (GB); Portia O'Callaghan, Natick, MA (US); Loren P. Dean, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/229,791

(22) Filed: Aug. 5, 2016

(65) Prior Publication Data

US 2017/0033991 A1 Feb. 2, 2017

Related U.S. Application Data

(63) Continuation of application No. 14/467,826, filed on Aug. 25, 2014, now Pat. No. 9,413,850, which is a
(Continued)

(51) Int. Cl.
*H04L 12/24* (2006.01)
*G06F 9/445* (2006.01)
(Continued)

(52) U.S. Cl.
CPC ...... *H04L 41/0813* (2013.01); *G06F 9/44505* (2013.01); *H04L 41/00* (2013.01);
(Continued)

(58) Field of Classification Search
CPC ........ H04L 67/34; H04L 67/10; H04L 67/42; H04L 12/24; H04L 29/12594; H04L 61/30; G06F 9/44505
See application file for complete search history.

(56) References Cited

U.S. PATENT DOCUMENTS 5,050,088 A 9/1991 Buckler et al.
5,475,819 A * 12/1995 Miller ................ G06F 9/547
700/178
(Continued)

OTHER PUBLICATIONS

International Search Report for Application No. PCT/US2006/044076, 3 pages, dated May 10, 2007.
(Continued)

*Primary Examiner* — Andrew Lai
*Assistant Examiner* — Chuong M Nguyen
(74) *Attorney, Agent, or Firm* — Harrity & Harrity, LLP

(57) ABSTRACT

Exemplary embodiments allow a user to create configurations for use in distributed computing environments. Configurations can be arranged in hierarchies in which elements of the hierarchy can inherit characteristics from elements in other layers of the hierarchy. Embodiments also allow a user to flatten a hierarchical configuration to remove hierarchical dependencies and/or inheriting capabilities of elements in the hierarchy. Exemplary embodiments further allow users to deploy a distributed computing configuration on their desktop to evaluate performance of the configuration and then deploy the configuration in a distributed computing environment without having to change programming code run on the desktop/distributed computing environment.

20 Claims, 25 Drawing Sheets

Related U.S. Application Data continuation of application No. 12/874,634, filed on Sep. 2, 2010, now Pat. No. 8,819,119, which is a continuation-in-part of application No. 12/761,777, filed on Apr. 16, 2010, now Pat. No. 8,041,790, which is a continuation of application No. 11/880,621, filed on Jul. 23, 2007, now Pat. No. 7,730,166, which is a continuation of application No. 11/271,009, filed on Nov. 10, 2005, now Pat. No. 7,634,530.

(60) Provisional application No. 61/331,684, filed on May 5, 2010.

(51) Int. Cl.
    *H04L 29/08* (2006.01)
    *H04L 29/06* (2006.01)
    *H04L 29/12* (2006.01)

(52) U.S. Cl.
    CPC ............. *H04L 67/10* (2013.01); *H04L 67/34* (2013.01); *H04L 67/42* (2013.01); *H04L 29/12594* (2013.01); *H04L 61/30* (2013.01)

(56) References Cited

U.S. PATENT DOCUMENTS

| | | | |
|---|---|---|---|
| 5,909,542 A | 6/1999 | Paquette et al. | |
| 6,026,397 A | 2/2000 | Sheppard | |
| 6,112,225 A | 8/2000 | Kraft et al. | |
| 6,647,408 B1 | 11/2003 | Ricart et al. | |
| 6,895,338 B2 | 5/2005 | Hsiung et al. | |
| 6,907,572 B2 | 6/2005 | Little et al. | |
| 6,925,642 B1 | 8/2005 | Commander | |
| 6,970,844 B1* | 11/2005 | Bierenbaum | G06Q 10/00 705/1.1 |
| 6,988,139 B1 | 1/2006 | Jervis et al. | |
| 7,103,628 B2* | 9/2006 | Neiman | G06F 9/5038 709/201 |
| 7,243,121 B2 | 7/2007 | Neiman et al. | |
| 7,299,274 B2 | 11/2007 | Rajarajan et al. | |
| 7,376,693 B2 | 5/2008 | Neiman et al. | |
| 7,509,244 B1 | 3/2009 | Shakeri et al. | |
| 7,634,530 B2 | 12/2009 | Dean et al. | |
| 7,730,166 B2 | 6/2010 | Dean et al. | |
| 7,769,794 B2 | 8/2010 | Moore et al. | |
| 8,041,790 B2 | 10/2011 | Dean et al. | |
| 8,819,119 B2* | 8/2014 | Stefansson | G06F 9/44505 702/22 |
| 9,413,850 B2 | 8/2016 | Stefansson et al. | |
| 2001/0023440 A1 | 9/2001 | Franklin et al. | |
| 2002/0123671 A1 | 9/2002 | Haaland | |
| 2003/0081790 A1 | 5/2003 | Kallahalla et al. | |
| 2003/0120701 A1 | 6/2003 | Pulsipher et al. | |
| 2003/0120709 A1 | 6/2003 | Pulsipher et al. | |
| 2003/0191795 A1 | 10/2003 | Bernardin et al. | |
| 2003/0210275 A1 | 11/2003 | Draschwandtner et al. | |
| 2004/0044718 A1* | 3/2004 | Ferstl | G06F 9/5044 709/200 |
| 2004/0215402 A1* | 10/2004 | Hsiung | G01N 33/0031 702/22 |
| 2004/0230637 A1 | 11/2004 | Lecoueche et al. | |
| 2005/0125798 A1 | 6/2005 | Peterson | |
| 2005/0149545 A1 | 7/2005 | Zenz | |
| 2005/0188075 A1 | 8/2005 | Dias et al. | |
| 2006/0036568 A1* | 2/2006 | Moore | G06F 17/30126 |
| 2006/0168347 A1 | 7/2006 | Martin | |
| 2006/0206912 A1 | 9/2006 | Klarfeld et al. | |
| 2007/0083620 A1 | 4/2007 | Pedersen | |

OTHER PUBLICATIONS

Flanagan et al., "Java Enterprise, in a Nutshell, a Desktop Quick Reference," O'Reilly & Associates, Inc., Paula Ferguson, ed. (1999).

Frey et al., "Condor-G: A Computation Management Agent for Multi-Institutional Grids," Proceedings of the 10th IEEE Symposium on High Performance Distributed Computing (2001).

Goux et al., "Metacomputing and the Master-Worker Paradigm," retrieved online at http://citeseer.ist.psu.edu/goux00metacomputing.html (2000).

Hamilton et al., "Unleashed, Programming Windows NT4," SAMS Publishing (1996).

Hunter et al., Java Servlet Programming, O'Reilly & Associates, Inc., Paula Ferguson, ed. (1998).

Husbands, "Interactive Supercomputing," pp. 1-96 (1999).

Kulkarni, "An Intelligent framework for Master-Worker Applications in a Dynamic Metacomputing Environment," pp. 1-15 (2001).

Raman et al., "Policy Driven Heterogeneous Resource Co-Allocation with Gangmatching," Proceedings. 12$^{th}$ International Symposium on High Performance Distributed Computing, pp. 80-89 (2003).

Roy et al., "Condor and Preemptive Resume Scheduling," Grid Resource Management: State of the Art and Future Trends, Klumer Academic Publishers, Jarek Nabrzyski, Ed., pp. 135-144 (2003).

Thain et al., "Distributed Computing in Practice: The Condor Experience," Concurrency: Pract. Exper., pp. 0-20 (2004).

International Preliminary Report of Patentability for Application No. PCT/US2006/044076, dated Nov. 27, 2007.

Raymond, "The Art of Unix Programming" (2003).

European Office Action for Application No. 06837489.1, dated Apr. 8, 2011.

\* cited by examiner

| Configurable Items | Configurable Properties |
|---|---|
| Resource | Type<br>Name<br>HostName<br>LookupURLs |
| Scheduler | DataLocation<br>HasSharedFilesystem<br>ClusterMatlabRoot<br>SubmitArguments<br>SubmitFcn |
| Job | PathDependencies<br>FileDependencies<br>Timeout<br>RestartWorker<br>MaximumNumberOfWorkers<br>MinimumNumberOfWorkers |
| Task | Timeout<br>CaptureCommandWindowOutput<br>TaskFinishedFcn |

*Fig. 5*

API PUBLIC FIELDS

| Description | Field Name | Type | Access |
|---|---|---|---|
| Name of the configuration | Name | String | Public get/set |
| Description of the configuration | Description | String | Public get/set |
| The parent configuration. The name of the parent configuration if it is another configuration in the Configurations Set. The full path to the parent configuration if it is a file. | ParentConfiguration | String | Public get/set |
| Flag indicating if this configuration has a parent configuration. Derived from whether or not ParentConfiguration is empty. | HasParentConfiguration | Bool | Public get |
| The cluster type to which this configuration relates – this dictates which properties are in AllConfigurableProperties. E.g. 'local', 'lsf', 'generic' etc. | Type | String | Public get |

Fig. 14A

API PUBLIC METHODS

| Description | Name | Output Arguments | Input Arguments | Access |
|---|---|---|---|---|
| Gets the value of the specified property | getValue | Value of property | propName | Public |
| Sets the value of the specified property to the specified value. If the specified property is not already in the PropertiesDefined list, it is added to the list. | setValue | - | propName, propValue | Public |
| Whether or not the specified property is defined in this configuration. Probably used with revertToParentValue. | isPropertyDefined | bool | propName | Private |
| Revert back to the parent's value if the specified property has been overridden. This does NOT perform an update from the parent configuration's file. The specified property is moved from the PropertiesDefined list to the PropertiesNotDefined list. | revertToParentValue | - | propName | Public |
| Saves the configuration to the Configurations Set | saveToConfigurationSet | - | - | Public |
| Sets the configuration as the default | setAsDefault | - | - | Public |
| Exports the configuration to a file | exportToFile | - | filename | Public |
| Load a configuration from file into a configuration object and NOT into the Configurations Set. | loadFromFile | configuration | Filename | Public static |

Fig. 14B

API PRIVATE FIELDS

| Description | Field Name | Type | Access |
|---|---|---|---|
| The properties that have been explicitly defined in this configuration. Struct has fields 'Names' and 'Values'. If HasParentConfiguration = true, then these are the properties that have been overridden.<br><br>If there is no parent configuration, then all configurable properties are defined (some may have the <unset> value). When a new configuration is created from scratch, all properties are assigned the <unset> value. | PropertiesDefined | Struct | Private get/set |
| The properties that have not been defined (or not overridden) in this configuration.<br><br>If there is no parent configuration, then PropertiesNotDefined is empty since all configurable properties must be defined in the absence of a base configuration. | PropertiesNotDefined | Cell array of strings | Private get/set |
| All the properties that can be configured in this configuration (dictated by Type) | AllConfigurableProperties | Cell array of strings | Private get |
| A cache of the parent configuration's values (only if the parent configuration is a file) | ParentConfigurationCache | Configuration | Private get |

Fig. 14C

JOB/TASK CONFIGURATION CLASS

PUBLIC FIELDS

| Description | Field Name | Type | Access |
|---|---|---|---|
| Name of the configuration | Name | String | Public get/set |
| Description of the configuration | Description | String | Public get/set |
| The type of configuration -- this is always job/task | Type | String | Public get |

PUBLIC METHODS

| Description | Name | Output Arguments | Input Arguments | Access |
|---|---|---|---|---|
| Gets the value of the specified property | getValue | Value of property | propName | Public |
| Sets the value of the specified property to the specified value. | setValue | - | propName, propValue | Public |
| Whether or not the specified property is defined in this configuration. All properties will always be defined in job/task configurations since there is no concept of a parent configuration. This field is included to maintain consistency with ClusterConfiguration. | isPropertyDefined | bool | propName | Private |
| Saves the configuration to the Configurations Set | saveToConfigurationsSet | - | - | Public |
| Exports the configuration to a file | exportToFile | - | filename | Public |
| Load a configuration from file into a configuration object and NOT into the Configurations Set | loadFromFile | configuration | filename | Public static |

Fig. 14D

JOB/TASK CONFIGURATION CLASS

PUBLIC FIELDS

| Description | Field Name | Type | Access |
|---|---|---|---|
| All the properties that can be configured in this configuration type. | AllConfigurableProperties | Cell array of strings | Private get |
| The properties that have been explicitly defined in this configuration. Struct has fields 'Names' and 'Values'. All properties will always be defined in job/task configurations since there is no concept of a parent configuration. This field is included to maintain consistency with ClusterConfiguration. | PropertiesDefined | Struct | Private get/set |

*Fig. 14E*

CONFIGURATIONS SET STATIC METHODS

| Description | Name | Output Arguments | Input Arguments |
|---|---|---|---|
| Add a new configuration to the Configurations Set by loading (and copying the properties) from the specified file. The optional PV pairs for Name and Description would override the values in the file. | addConfigurationFromFile | configuration | Filename, PV pairs for Name, Description |
| Add a new configuration to the Configurations Set using the specified scheduler object in the workspace. | addConfigurationFromWorkspace | configuration | A valid Scheduler object, PV pairs for Name, Description |
| Add an alias into the Configurations Set | addAlias | - | Name of alias, cell array of configuration names |
| Remove an alias from the Configurations Set | removeAlias | - | Name of alias to remove |
| Get a handle to the configuration with the specified name from the Configurations Set | getConfiguration | configuration | Name of the configuration to retrieve |
| Add a new configuration of the specified type in the Configurations Set. Optional P-V pairs include 'Name', 'Description', 'parentConfiguration' (only available if type is not 'jobTask'). If parentConfiguration is specified, then the configuration type is inferred. The parentConfiguration must be the name of a configuration in the Configurations Set; it cannot be a file. | addConfiguration | configuration | Configuration type and optional P-V pairs. Configuration type can be 'local', 'lsf' etc, 'jobTask' |
| Duplicate a configuration that already exists in the Configurations Set. The duplicate configuration can either preserve the full parental hierarchy or be a flattened version. The default behaviour would be to create a new configuration with ".copyN" appended to the end of the configuration name and for the new configuration to preserve the parental hierarchy. | duplicateConfiguration | configuration | Name of configuration to be duplicated and optional P-V pairs for the name of the new configuration and whether the new configuration should be flattened. |
| Delete a configuration from the Configurations Set. | deleteConfiguration | - | Name of the configuration to be deleted |

*Fig. 14F*

CONFIGURATION SEARCH PATH

PUBLIC FIELDS

| Description | Field Name | Type | Access |
|---|---|---|---|
| The update frequency for the Configurations Search Path | updateFrequency | String: 'daily', 'weekly', 'monthly', 'yearly', 'never' | Public get/set |

*Fig. 14G*

PUBLIC METHODS

| Description | Name | Output Arguments | Input Arguments |
|---|---|---|---|
| Add the specified URI to the Configurations Search Path | addURI | - | URI |
| Remove the specified URI from the Configurations Search Path | removeURI | - | URI |
| Update the configurations in the Configurations Search Path now | updateNow | - | - |
| Find out when the next scheduled update is due to occur | getNextUpdateTime | String representation of a date and time | - |

*Fig. 14H*

PRIVATE FIELDS

| Description | Field Name | Type | Access |
|---|---|---|---|
| The update frequency for the Configurations Search Path | updateFrequency | String: 'daily', 'weekly', 'monthly', 'yearly' | Private get/set |
| When the next update is scheduled to occur. This is actually the time *before* which an update will not be performed. | nextUpdateTime | Numerical representation of date and time. | Private get |

*Fig. 14I*

DYNAMIC DEFINITION FOR CONCURRENT COMPUTING ENVIRONMENTS

RELATED APPLICATIONS

The present application is a continuation of U.S. patent application Ser. No. 14/467,826, filed Aug. 25, 2014 (now U.S. Pat. No. 9,413,850), which is a continuation of U.S. patent application Ser. No. 12/874,634, filed Sep. 2, 2010 (now U.S. Pat. No. 8,819,119), which claims priority to Provisional Patent Application No. 61/331,684, filed May 5, 2010, and is a continuation-in-part of U.S. patent application Ser. No. 12/761,777, filed Apr. 16, 2010 (now U.S. Pat. No. 8,041,790), which is a continuation of U.S. patent application Ser. No. 11/880,621, filed Jul. 23, 2007 (now U.S. Pat. No. 7,730,166), which is a continuation of U.S. patent application Ser. No. 11/271,009, filed Nov. 10, 2005 (now U.S. Pat. No. 7,634,530). The contents of all these applications are incorporated herein in their respective entireties.

BACKGROUND INFORMATION

The MATLAB® programming environment (hereinafter MATLAB) is a product of The Math Works, Inc. of Natick, Mass., which provides engineers, scientists, mathematicians, and educators across a diverse range of industries with an environment for technical computing applications. MATLAB® is an intuitive high performance language and technical computing environment that provides mathematical and graphical tools for mathematical computation, data analysis, visualization and algorithm development. MATLAB® integrates numerical analysis, matrix computation, signal processing, and graphics in an easy-to-use environment where problems and solutions are expressed in familiar mathematical notation, MATLAB® is used to solve complex engineering and scientific problems by developing mathematical models that simulate the problem. A model is prototyped, tested and analyzed by running the model under multiple boundary conditions, data parameters, or just a number of initial guesses. In MATLAB®, one can easily modify the model, plot a new variable or reformulate the problem in a rapid interactive fashion that is typically not feasible in a non-interpreted programming language, such as Fortran or C.

As a desktop application, MATLAB® allows scientists and engineers to interactively perform complex analysis and modeling in their familiar workstation environment. However, a single workstation can be limiting to the size of the problem that can be solved, because of the relationship of the computing power of the workstation to the computing power necessary to execute computing intensive iterative processing of complex problems in a reasonable time. For example, a simulation of a large complex aircraft model may take a reasonable time to ran with a single computation with a specified set of parameters. However, the analysis of the problem may also require the model be computed multiple times with a different set of parameters, e.g., at one-hundred different altitude levels and fifty different aircraft weights, to understand the behavior of the model under varied conditions. This would require five-thousand computations to analyze the problem as desired, and the single computer would take an unreasonable or undesirable amount of time to perform these simulations. In this case, the single computer would be allocated full-time to performing the computation while many computing resources on the network may be idle. Additionally, the benefit of the interactive features of the software is reduced as the computation time increases.

Hence, distributed computing is very useful for distributing tasks to multiple computing resources, especially for a computationally intensive problem. However, most technical computing software was not initially designed for distributed computing. Now, with the availability and possibility of distributed computing, software developers face the problem of how to configure the distributed computing environment and transform functions and codes initially designed for a desktop application to work in the distributed computing environment. Furthermore, the complexity of this transformation increases as software developers want to allow users to setup their own distributed computing environment, but at the same time minimize the amount of changes to the existing function signatures and minimize the amount of information that users need to enter about their environment.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIG. 5 is a table showing exemplary configurable properties of a concurrent computing environment;

FIGS. 14A-14I illustrate exemplary aspects of application program interfaces (APIs) that can be used for practicing exemplary embodiments of the invention.

DETAILED DESCRIPTION

The illustrative embodiments of the present invention provide for dynamic configuration of a concurrent computing environment. By specifying a configuration and/or number of concurrent computing labs, the present invention enables dynamic configuration of a concurrent computing environment. A concurrent computing lab is a computing resource that performs distributed computing or parallel computing. A computing resource can be a processor, a computer system, or other hardware with computational capabilities. The present invention also provides a solution to simplify computing environment settings for a function such that all the configuration information of the computing environment can be submitted via only a string. The present invention provides software developers with a consistent way to transform software tools originally implemented as a single desktop application to ones that may be used in a concurrent computing environment and at the same time enable users to configure their own computing environment without changing too much of the function signatures of the original software tools. It greatly simplifies the process of distributing tasks of an executable process in the concurrent computing environment.

The following illustrative embodiments will be described solely for illustrative purposes relative to a MATLAB-based technical computing environment. Although the illustrative embodiment will be described relative to a MATLAB-based application, one of ordinary skill in the art will appreciate that the present invention may be applied to parallel or distributed processing of technical computing tasks with other technical computing environments, such as technical computing environments using software products of LabVIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc.

Figure 1:
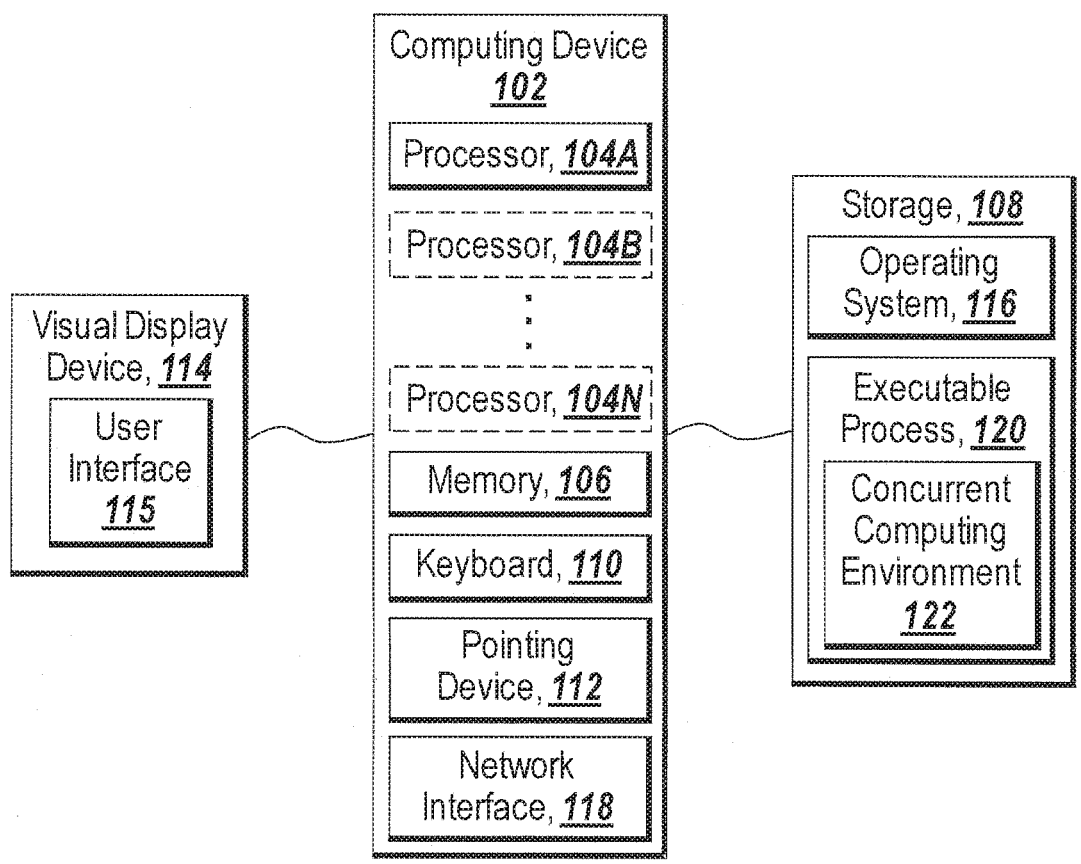
FIG. 1 is a block diagram of a computing device suitable for practicing an embodiment of the present invention.

FIG. 1 depicts an environment suitable for practicing an illustrative embodiment of the present invention. The environment includes a computing device 102 having memory 106, on which software according to one embodiment of the present invention may be stored, processor 104A, and optionally, processors 104B-N for executing software stored in the memory 106, and other programs for controlling system hardware. Each of the processors 104A-N can be a single or multiple core processor.

The memory 106 may comprise a computer system memory or random access memory. The memory 106 may comprise other types of memory as well, or combinations thereof. A user may interact with the computing device 102 through a visual display device 114 such as a computer monitor, which may include a user interface 115. The computing device 102 may include other I/O devices such a keyboard 110 and a pointing device 112, for example a mouse, for receiving input from a user. Optionally, the keyboard 110 and the pointing device 112 may be connected to the visual display device 114.

The computing device 102 may include other suitable I/O peripherals. The computing device 102 may further comprise a storage device 108, such as a hard-drive or CD-ROM, for storing an operating system 116 and other related software, and for storing executable process 120, such as parallel computing with MATLAB® or distributed computing with MATLAB®. Executable process 120 can be, but not limited to, an application, a program, a module, or a script. Executable process 120 may include a concurrent computing environment 122 to enable concurrent computing on the computing device 102. Additionally, the operating system 116 and executable process 120 can be run from a bootable CD, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections, wireless connections, or some combination of any or all of the above. The network interface 118 may comprise a built-in network adapter, network interface card, card bus network adapter, wireless network adapter, USB network adapter, modem or any other device suitable for interfacing the computing device 102 to any-type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

The computing device 102 can be running any operating system, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein.

Figure 2:
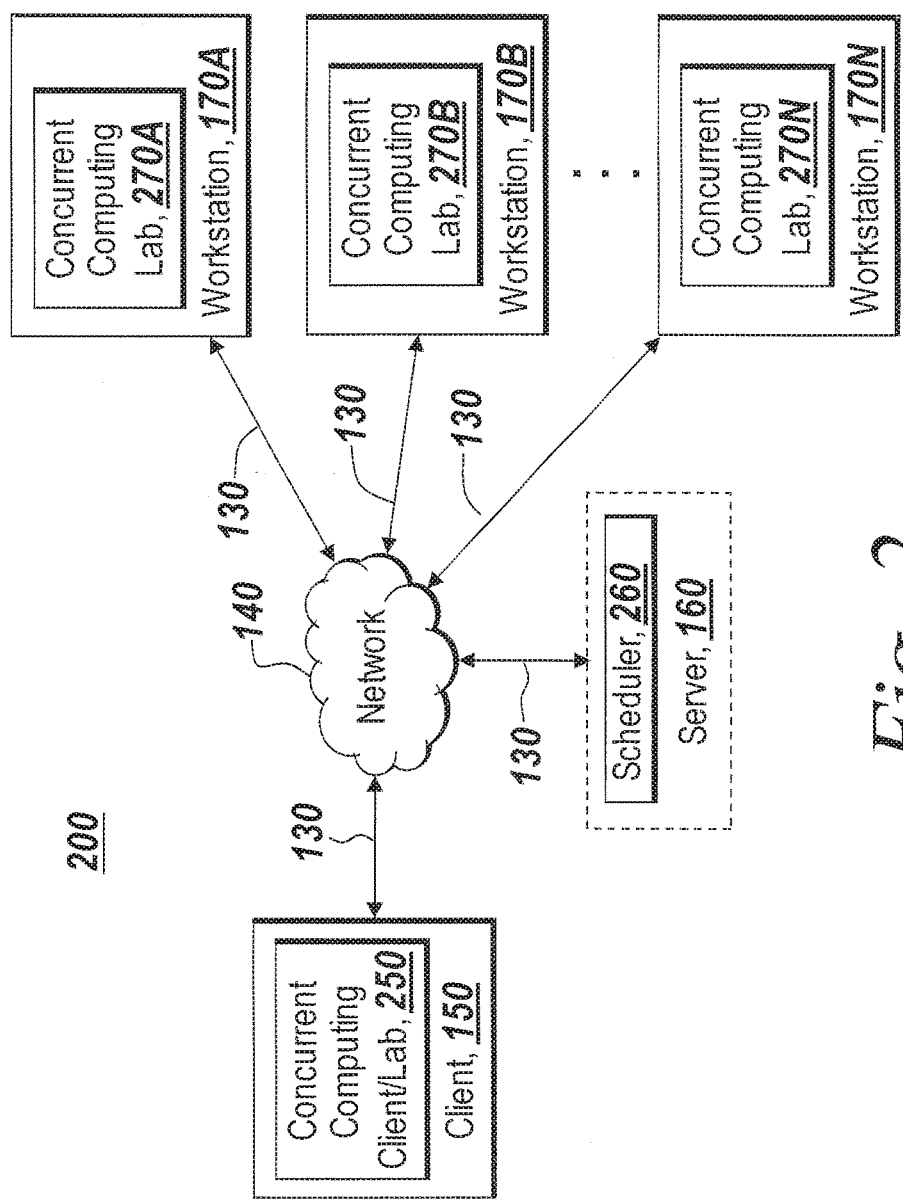
FIG. 2 is a block diagram of a concurrent computing system including more than one computing device for practicing an embodiment of the present invention.

FIG. 2 depicts an illustrative embodiment of a concurrent computing system 200 that is suitable to practice with the present invention. In brief overview, the system 200 comprises a concurrent computing client 250 running on a client 150 and after concurrent computing client 250 receives information on the configuration of the concurrent computing environment and optionally the number of concurrent computing labs needed, concurrent computing labs 270A-N on workstations 170A-N are created and the concurrent computing environment is configured using the configuration information. The concurrent computing client 250 is in communication with the concurrent computing labs 170A-N through network communication channels 130 over a network 140. One of ordinary skill in the art will appreciate that workstations 170A-N, server 160, and client 150 may have one or more concurrent computing lab.

In one embodiment of the present invention, once concurrent computing labs 270A-N are created, executable process 120 sets up communication channels among the concurrent computing labs 270A-N. A file may be used to store identification information of all concurrent computing labs, such as IP addresses, rankings, and assigned identification numbers. All concurrent computing labs may have a copy of this file so that every lab has identifying information about other labs in the concurrent computing environment. The concurrent computing labs may communicate with each other by sending and receiving messages using the identification information.

In one embodiment, the concurrent computing labs may interface via socket-based communications over a protocol including but not limited to, TCP/IP, Infiniband, and Myrinet, implementing a custom message specification or other available message communications projects that allow the concurrent computing labs to send and receive messages. In another embodiment, Message Passing Interface (MPI) may be used to setup the communication among the concurrent computing labs. MPI is a de facto standard for communication among the nodes running a parallel program on a distributed memory system. Implementation of the MPI specification permits programs with separate address spaces to synchronize with one another and move data from the address space of one process to that of another by sending and receiving messages. One of ordinary skill in the art will appreciate that the present invention is not limited to the use of MPI, but other interfaces, such as Remote Method Invocation (RMI) may be used with the present invention.

The concurrent computing client 250 can be a technical computing software application that provides a technical computing and/or graphical modeling environment for generating block diagram models and to define mathematical algorithms for simulating models. The concurrent computing client 250 may include all or a portion of the functionality provided by the stand-alone desktop application of MATLAB®. Additionally, the concurrent computing client 250 can be any of the software programs available in the MATLAB® product family. Furthermore, the concurrent computing client 250 can be a custom software program or other software that accesses functionalities of software programs in the MATLAB® product family via an interface, such as an application programming interface, or by other means. One of ordinarily skill in the art will appreciate the various combinations of client types may access the functionalities of the system.

In one embodiment of the present invention, concurrent computing client 250 is also a concurrent computing lab. In such a configuration, communication channels are setup among all the concurrent computing labs (concurrent computing client 250 and concurrent computing labs 270A-N). Each of the concurrent computing labs (including the concurrent computing client 250) has its local copy of a computer program that is executed in the corresponding concurrent computing labs, so there is no main concurrent computing lab that distributes executions to the other concurrent computing labs. The concurrent computing client 250 will additionally have the functionality to accept inputs and/or commands from a user related to the computer program using a tool such as an Integrated Development Environment (IDE). The concurrent computing client 250 and concurrent computing labs 270A-N can be configured to perform distributed computing or parallel computing.

In another embodiment of the present invention, concurrent computing client 250 is not involved in the concurrent processing of tasks. The concurrent computing labs 270A-N are setup after concurrent computing client 250 uses information regarding the number of labs to set up for concurrent computing. Once set up, communication channels are created among the concurrent computing labs 270A-N. In one embodiment of the present invention, each of the concurrent computing labs 270A-N has its local copy of a computer program that is executed in the corresponding concurrent computing labs. Concurrent computing labs 270A-N collaborate with each other and process tasks given by the concurrent computing client 250.

In one embodiment of the present invention, functions can be defined, by the concurrent computing client 250 with an application programming interface and/or programming language, representing a technical computing task to be executed by either a technical computing environment local to the client 150, or remote on the workstations 270A-N. Tasks can be declared on a concurrent computing client 250 and additionally organized into jobs. A job is a logical unit of activities, or tasks that are processed and/or managed collectively. A task defines a technical computing command, such as a MATLAB compatible command, to be executed, and the number of arguments and any input data to the arguments. A job is a group of one or more tasks.

In one aspect of the present invention, a task can be directly distributed by the concurrent computing client 250 to one or more computing resources, such as workstations 170A-N. A computing resource performs technical computing on a task and may return a result to the concurrent computing client 250.

The programming language of the concurrent computing client 250 includes mechanisms to define a task to be distributed and to communicate the task to the concurrent computing labs 270A-N on the workstations 170A-N, or alternatively, on the client 150. Also, the application programming interface and programming language of the concurrent computing client 250 includes mechanisms to receive results from the execution of technical computing of the task from concurrent computing labs 280A-N. For example, the concurrent computing client 250 may declare a variable to hold a result returned from the technical computing labs 270A-N performing technical computing of a function involving distributed arrays.

The distributed functionality features of the programming languages of concurrent computing client 250 allows the concurrent computing client 250 to use the computing resources that may be available from concurrent computing labs 270A-N on the workstations 170A-N to perform technical computing of tasks. This frees up the concurrent computing client 250 to perform other tasks, or the client computer 150 to execute other software applications.

Each of the concurrent computing labs 270A-N of the system 200 can be, but not limited to, a technical computing software application that provides a technical computing environment for performing technical computing of tasks, such as those tasks defined or created by the concurrent computing client 250. Each of the concurrent computing labs 270A-N can also be an instance of executable process 120, a module, a service, a software component, or a session. Each of the concurrent computing labs 270A-N includes support for technical computing of functions defined in the programming language of MATLAB®.

Concurrent computing labs 270A-N can include all the functionality and software components of the concurrent computing client 250, or it can just include those software components it may need to perform technical computing of tasks it receives for execution. The concurrent computing labs 270A-N may be configured to and capable of running any of the modules, libraries or software components of the MATLAB® product family. As such, the concurrent computing labs 270A-N may have all or a portion of the software components of MATLAB® installed on the workstation 170, or alternatively, accessible on another system in the network 140.

The concurrent computing labs 270A-N have mechanisms to receive a task-distributed from the concurrent computing client 250. The concurrent computing labs 270A-N are capable of performing technical computing of the task as if the concurrent computing client 250 was performing the technical computing in its own technical computing environment. The concurrent computing labs 270A-N also have mechanisms, to return a result generated by the technical computing of the task to the concurrent computing client 250.

The concurrent computing labs 270A-N can be available on an as needed basis to the concurrent computing client 250. When not performing technical computing of tasks from the concurrent computing client 250, the workstations 170A-N of the concurrent computing labs 270A-N can be executing other software programs, or the concurrent computing labs 270A-N can perform technical computing of tasks from other concurrent computing clients.

In another aspect of the present invention, the system, includes a server 160 comprises a scheduler 260. The scheduler 260 can be a scheduler provided with executable process 120, a generic scheduler, or a third-party scheduler that is designed and provided a company or individual that does not provide executable process 120. The server 160 communicates over a network communication channel 130 on the network 140 to the workstations 170A-N. One of ordinary skill in the art will appreciate that any of the workstations 170A-N may include more than one technical computing lab to practice the present invention. Additionally, client 150 and server 160 may also include one or more concurrent computing labs.

The scheduler 260 comprises one or more application software components to provide for the automatic distribution of tasks from the concurrent computing client 250 to one or more of the concurrent computing labs 270A-N. The scheduler 260 allows the concurrent computing client 250 to delegate the management of task distribution to the scheduler 260. The scheduler may also set up for concurrent computing client 250 the concurrent computing labs 270A-N by using the information received from the concurrent computing client 250 regarding the number of concurrent computing labs needed and other configuration information. Hence, the concurrent computing client 250 does not need to know the specifics of the concurrent computing labs 270A-N. The concurrent computing client 250 can define a function to submit the task to the scheduler 260, and get a result of the task from the scheduler 260. As such, the scheduler 260 provides a level of indirection between the concurrent computing client 250 and the concurrent computing labs 270A-N.

This eases the distributed programming and integration burden on the concurrent computing client 250. The concurrent computing client 250 does not need to have prior knowledge of the availability of the workstations 170A-N. For multiple task submissions from, the concurrent computing client 250, the scheduler 260 can manage and handle the delegations of the tasks to the concurrent computing labs 270A-N and hold the results of the tasks on behalf of the concurrent computing client 250 for retrieval after the completion of technical computing of all the tasks distributed by concurrent computing client 250. In an alternative implementation, the concurrent computing labs 270A-N may provide concurrent computing client 250 directly the results of the tasks assigned to concurrent computing labs 270A-N by the scheduler 260. The scheduler 260 can further include an object-oriented interface to provide control of delegating tasks and obtaining results in the system 200. The scheduler 260 also provides an interface for managing a group of tasks collectively as a single unit called a job, and on behalf of a concurrent computing client 250, submitting those tasks making up the job, and obtaining the results of each of the tasks until the job is completed. One of ordinarily skill in the art will recognize the functions and operations of the scheduler 260 can be separated into various software components, applications and interfaces. Additionally, the functions and operations of the scheduler 260 may reside on either the concurrent computing client 250 or one of the concurrent computing labs 270A-N instead of the server 160.

Additionally, each of the client 150, the server 160, and the workstations 170A-N can be running the same or different operating systems with the same or different processors. For example, the client 150 can running Microsoft® Windows, the server 160 can be running a version of Unix, and the workstations 170A-N a version of Linux. Alternatively, each of the client 150, the server 160 and the workstations 170A-N can be running Microsoft® Windows®. One of ordinarily skill in the art will recognize the various combinations of operating systems and processors that can be running on any of the computing devices (client 150, server 160, workstations 170A-N).

Figure 3:
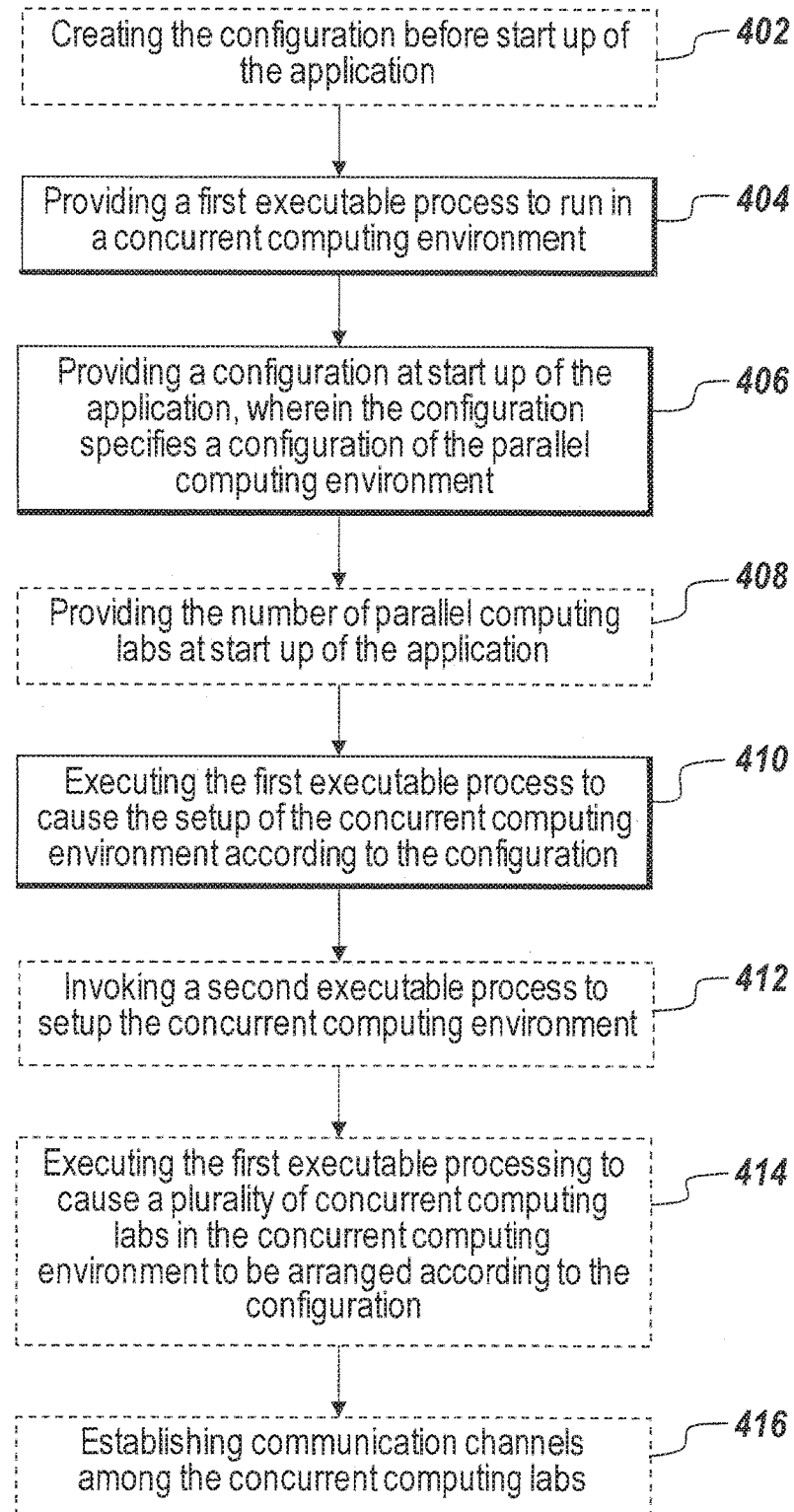
FIG. 3 is a flowchart illustrating the steps taken to practice one embodiment of the present invention in a networked system.

FIG. 3 depicts a flowchart illustrating steps to taken to practice one embodiment of the present invention using the system 200 as shown in FIG. 2. A user may create at step 402 a custom configuration for setting up a preferred concurrent computing environment. At step 404, a first executable process is provided and it is capable of running in a concurrent computing environment. A configuration is provided at start up of the executable process in step 406 so that a concurrent computing environment may be set up according to the configuration specified in the configuration.

A configuration can be stored in a number of different places including, but not limited to, memory, a file, a database, or a preference property of executable process 120. A configuration may include one or more property-value (PV) pairs, where every property is assigned a specific value. FIG. 5 shows a table of exemplary configurable properties. Configurable properties that can be included in a configuration include, but not limited to, properties of computing resources (type, name, hostname, and/or URLs), properties of schedulers (data location, shared file system, cluster root, argument submission, and/or function submission), properties of job (path dependencies, file dependencies, timeout, restart, maximum number of computing resources, and/or minimum number of computing resources), and properties of tasks (timeout, output of command window, and/or task finished indicator).

A configuration may be provided using a command line flag at start up of the executable process. Alternatively, a configuration may be provided via a graphical user interface. Because all of the configuration information of the computing environment is stored in the configuration, a single string may be used to represent and name the configuration. Hence, the configuration may be referred to and retrieved by its name. Hence users can reuse the configuration at several different occasions and do not need to enter configuration information for the same computing environment over and over again, which is cumbersome and error prone. In one aspect of the present invention, more than one configuration may be provided. In such a case, if there is conflicting information regarding any configurable properties, the last value that a configuration property is assigned to will be used in setting up the computing environment.

After specifying the configuration at step 406, a user can optionally provide a specified number of the multiple concurrent computing labs that the user wishes to use in the concurrent computing environment at step 408. Similarly, the number of concurrent computing labs may be specified using a command line or via a graphical user interface before start up of the executable process. The first executable process is then executed in step 410 to use the configuration for configuring the concurrent computing environment according to the configuration information in the configuration and the number of concurrent computing labs if specified. In one embodiment, the first executable process invokes a second executable process to setup the concurrent computing environment in step 412.

In another embodiment of the present invention, the first executable process is executed in step 414 to cause multiple concurrent labs in the concurrent computing environment to be arranged according to the configuration. Once the concurrent computing labs are set up, communication channels may be established among the concurrent computing labs In step 416. One of ordinary skill in the art will appreciate that one or more executable processes can carry out the different steps of the present invention, and the present invention is not limited to a specific process carrying out a specific step.

The present invention of one-string configuration is not only useful during start up of an executable process but it is also useful for automatically creating and submitting batch jobs in a function call. Batch jobs are used herein to refer to tasks submitted by an instance of the executable process to one or more other computing resources that has at least a part of the functionality of the executable process but the instance of the executable process does not participate in the execution of the tasks.

Figure 4A:
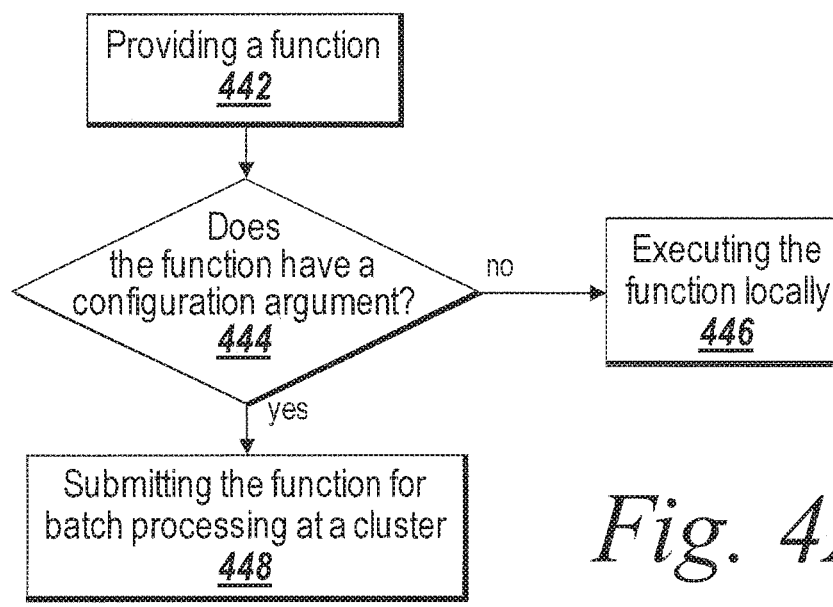
FIG. 4A is a flow chart illustrating the steps taken to practice one embodiment of the present invention in a cluster environment.

FIG. 4A depicts a flowchart illustrating steps taken to practice one embodiment of the present invention. In step 442, a function is provided. Executable process 120 then checks if the function has a configuration argument in step 444. If the function does not have a configuration argument, the function is executed locally in step 446. On the other hand, if the function does have a configuration argument, the function is submitted to a cluster for batch processing in step 448.

For example, a standard function call f(x) without any configuration argument will cause the function to be executed locally by the executable process 120, whereas f(x, config) will signal the executable process 120 to automatically create and submit the function to be executed in a cluster environment having one or more computing resources. One of ordinary skill in the art will appreciate that the present invention allows the cluster environment to be set up via the configuration argument providing a configuration such that distributed computing or concurrent computing may be used to execute the batch jobs. A scheduler, such as scheduler 260, may be used with the present invention to submit jobs to the cluster environment.

Figure 4B:
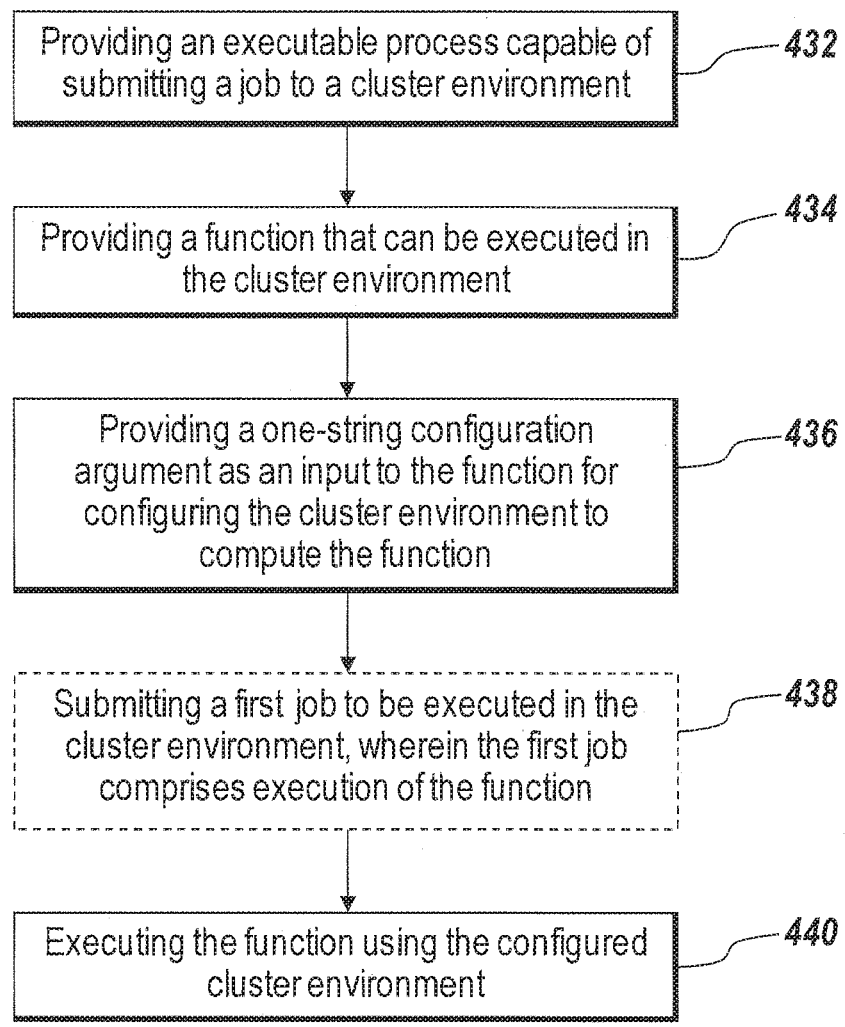
FIG. 4B is a flow chart illustrating the steps taken to practice yet another embodiment of the present invention in a cluster environment.

FIG. 4B illustrates the steps taken to practice one embodiment of the present invention. In step 432, an executable process capable of submitting a job to a cluster environment is provided. In step 434, a function that can be executed in a cluster environment is also provided. A one-string configuration argument is provided as an input to the function for configuring the cluster environment to compute the function in step 436. The function may be optionally included in a job and the job may be submitted to be executed in the cluster environment in step 438. In step 440, the function is executed using the configured cluster environment.

Once a configuration is used either at start up of an application or in a function call, the configuration is further applied to objects that are created for use in the concurrent computing environment. Object methods can accept the single string configuration argument and extracts information from the configuration argument. A configuration may include information that is both relevant and irrelevant to a specific object method. For each method and function that can accept a configuration as an argument, the method or function is capable of identifying which property-value (PV) pairs stored in the configuration is relevant to the method or function.

In one embodiment of the present invention, each PV pair stored in a configuration is associated with a section that identifies a specific function or method to which the PV pair should be applied to. For example, a configuration can be implemented as a file that contains three columns of data where the first column is a section column, the second column is a property column, and the third column a value column. In this manner, a specific object method or a function can easily identify the relevant section and use only the PV pairs in the relevant section with the object method or function. In one aspect of the present invention, different types of objects can use the same setting specified in the configuration.

For example, different types of job objects can be utilized in the present invention, where the setting for a job object is specified in the configuration under a common job section. In another aspect of the present invention, different types of objects can use different settings specified under different sections in the configuration. One of ordinary skill in the ail will appreciate that the present invention is not limited to the specific exemplary implementation discussed herein and many modifications can be made without departing from the spirit and scope of the present invention.

In one embodiment, a configuration with one or more PV pairs is provided to a function or an object method. The function or the object method can extract the relevant PV pairs found in the configuration and puts the PV pairs into the place where the configuration was specified in the argument list. For example, in a function call to find computing resources (findResource) to use in the concurrent computing environment assuming the configuration (named 'myconfig') stores a single PV pair for the findResource method/section such as follows:

'Name'='myjobmanager'

Then the function call to findResource method using the configuration named 'myconfig' may look like the following expression sched=findResource('scheduler', . . . , 'configuration', 'myconfig', . . . );

which is expanded to and replaced with the following expression sched=findResource('scheduler', . . . , 'Name', 'myjobmanager', . . . );

In one embodiment of the present invention, after findResource function is given a configuration argument, findResource invokes a second function to find out which PV pairs in the configuration is applicable. The second function returns the relevant PV pairs to the findResource function and then findResource function places the relevant PV pairs in the argument list in place of the configuration argument. An object method can also accept a configuration argument and retrieves the relevant PV pairs to apply to one or more properties of an object. For example, given a scheduler object named sched and a desirable configuration named myconfig, a set method of the scheduler object using the desired configuration can look like the following:

set(sched, 'configuration', 'myconfig');

In a further embodiment of the present invention, each function and object method that can accept more than one configuration argument, such as

```
sched = findResource('scheduler', ....,'configuration', 'myconfig1',
   'configuration', 'myconfig2', ...);
``` where both myconfig1 and myconfig2 are provided as configuration input arguments. The function or object method again extracts relevant PV pairs from each configuration and apply the PV pairs to the function or object method. If there is conflicting information regarding any configurable properties, the last value that a configuration property is assigned to will be effective. In the example given above, a property in a PV pair in myconfig2 will overwrite any value the property was assigned to in myconfig1.

Figure 6:
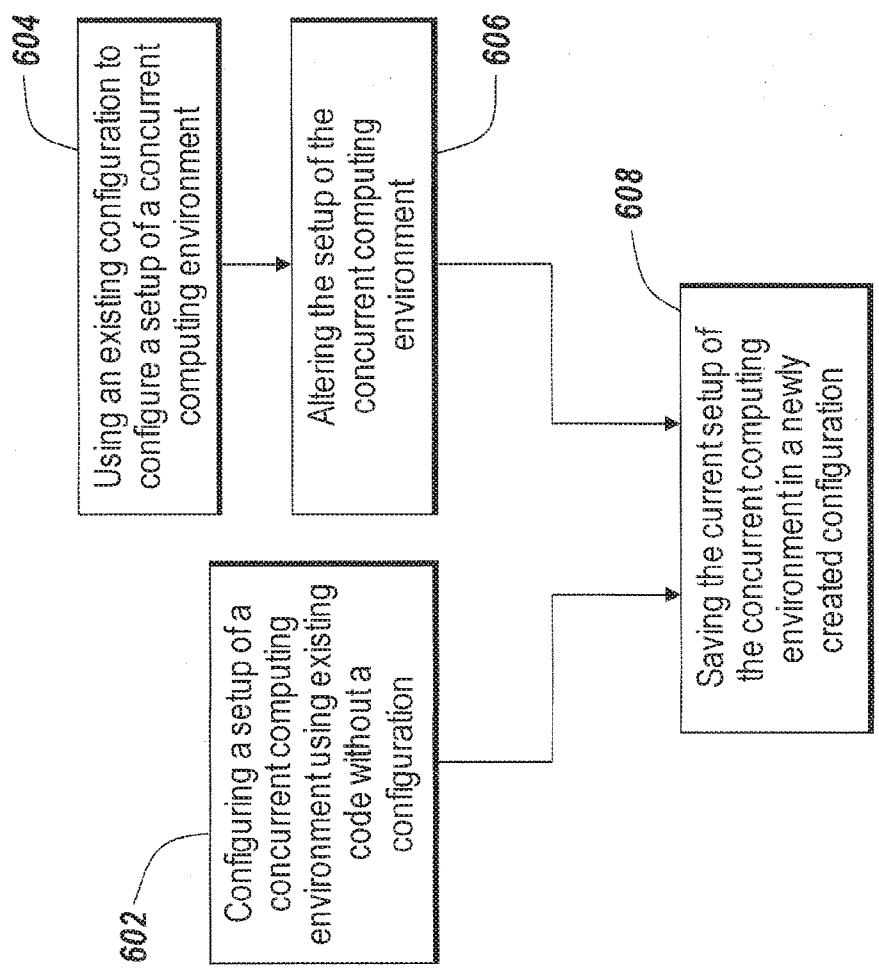
FIG. 6 illustrates a flow chart showing the steps taken to practice one embodiment of the present invention.

FIG. 6 illustrates a flowchart showing steps taken to practice another embodiment of the present invention. In one aspect of the present invention, a setup of a concurrent computing environment is configured using existing code without the use of a configuration in step 602. A new configuration can be created in step 608 to save the current setup of the concurrent computing environment. In another aspect of the present invention, a setup of a concurrent computing environment is configured using an existing configuration in step 604. The setup of the concurrent computing environment is then altered in step 606. The setup of the concurrent computing environment can be altered using, but not limited to, explicit code, another existing configuration, or a change of a property or preference of the concurrent computing environment. After the setup of the concurrent computing environment is altered, a new configuration can be created to store the current setup of the concurrent computing environment in step 608.

A configuration may be created from an existing setup of a concurrent computing environment. The advantage of this feature of the present invention is that users do not need to alter or rewrite their existing code including a setup for a concurrent computing environment. A configuration may be created from the existing code and the configuration can be saved for future use. In one embodiment of the present invention, the existing code is read and configuration information of the concurrent computing environment is extracted to create a configuration. In another embodiment of the present invention, the existing code is executed such that a concurrent computing environment is setup and a configuration is created using configuration information gathered from querying the setup of the existing concurrent computing environment. Additionally, a user may initially use a configuration to setup a concurrent computing environment and subsequently change the setup of the concurrent computing environment by some explicit code, after which the user may choose to save the altered setup by creating a configuration storing configuration information of the altered setup.

Figure 7:
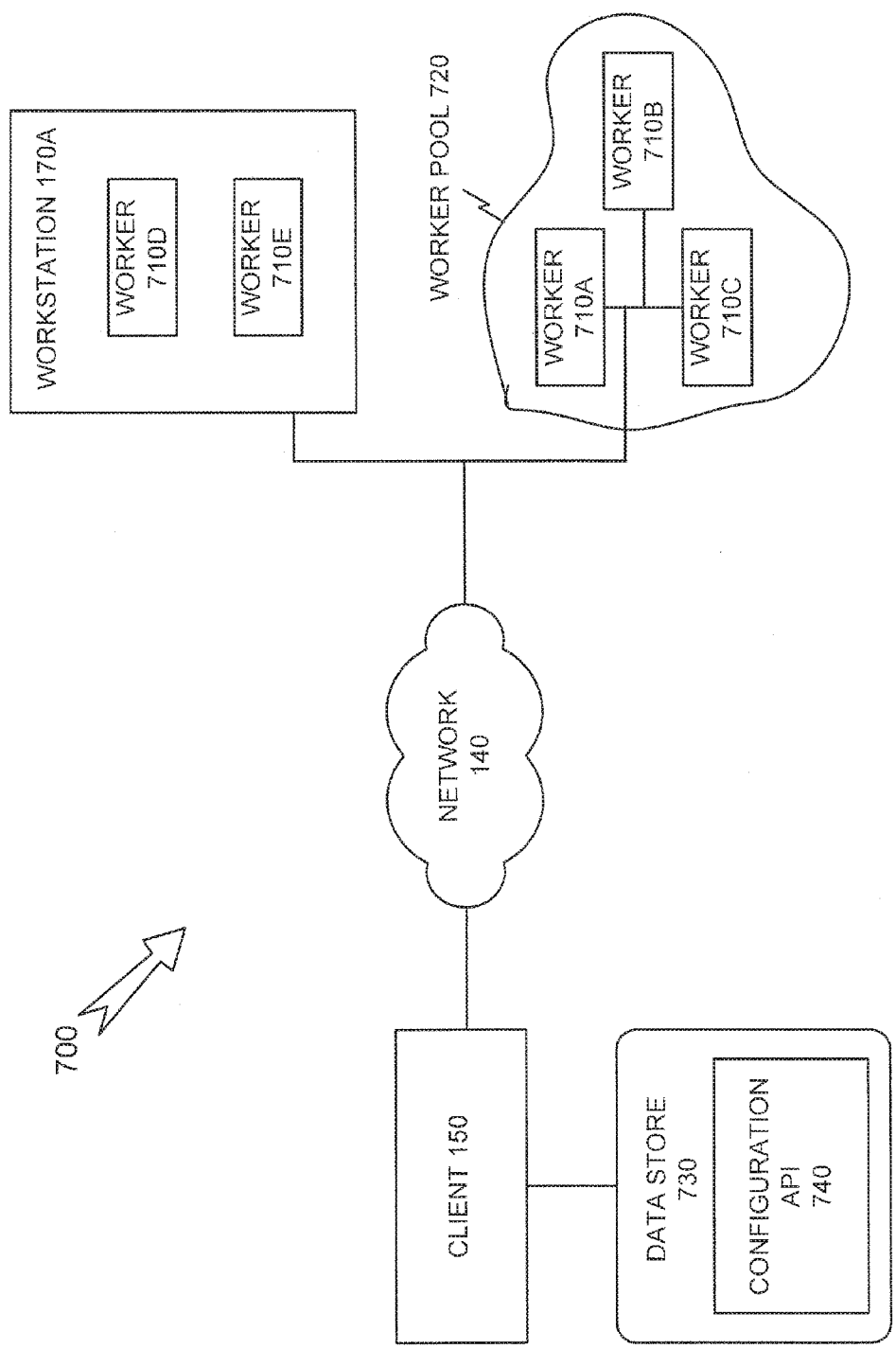
FIG. 7 illustrates an exemplary system for practicing embodiments of the invention.

FIG. 7 illustrates an exemplary system 700 for practicing embodiments of the invention. System 700 can include client 150, network 140, workstation 170A, worker pool 720 and data store 730. System 700 is illustrative and other embodiments can include additional components, fewer components, or components in arrangements that differ from the arrangement of FIG. 7.

Client 150, network 140 and workstation 170A may be configured as earlier described herein. Worker pool 720 may include a plurality of workers 710A, B, C, etc. (collectively workers 710) that perform processing on behalf of a requesting entity, such as client 150. Workers 710 may be arranged according to a configuration (e.g., a cluster configuration) when performing distributed processing operations on behalf of the requesting entity. Workers 710 may be located in worker pools 720 connected to network 140 or may reside on devices, such as workstation 170A or client 150. For example, workstation 170A may include workers 170D and 170E. In system 700 a configuration may configure workers in worker pool 720 and workers in workstation 170A to cooperatively perform distributed processing tasks on behalf of a requesting entity, such as client 150. For example, workers in worker pool 720 and workstation 170A may simultaneously processes one or more tasks specified by a configuration file. As used herein a first worker and a second worker may simultaneously perform processing activities as long as both workers perform at least one processing operation at the substantially the same time.

Data store 730 may be a mechanism that stores information for use by devices in system 700. Data store 730 may be a storage device, a data structure, a data base, etc., capable of storing machine readable information or instructions. For example, data store 730 may store a configuration application programming interface (API) 740, where configuration API 740 is used for configuring workers 710 to perform distributed processing tasks. Data store 730 may further store data used by workers 710 when performing distributing processing tasks; results produced by workers 710; configuration files for clusters, job, or tasks; etc.

System 700 may allow users to create and modify cluster configurations for determining cluster resources for performing distributed processing and/or job/task configurations for determining resources for processing jobs and/or tasks. System 700 may further allow users to create aliases for referring to configurations, to import or export configurations, to establish relationships between configurations, such as hierarchical relationships between configurations, to select configurations via path names, such as file path names or uniform resource identifiers (URIs), to identify configurations using an auto-discovery mechanism, to apply security mechanisms to configurations, etc.

System 700 may further allow a user to apply a configuration to a desktop environment so that the user can setup and diagnose a distributed computing configuration. For example, the user may use the desktop environment to emulate a cluster configuration. The user may debug the emulated cluster using the desktop to avoid tying up remote processing resources that may be costly to use. System 700 may allow the user to apply a configuration to distributed computing resources that corresponds to the emulated configuration tested on the desktop environment. The configuration applied to distributed resources can be used to perform distributed computing operations on a larger scale and/or faster than the operations can be performed on the desktop environment. For example, the user may be able to deploy a cluster configuration corresponding to the emulated configuration onto workers 710 without having to modify his/her program code. Embodiments of system 700 may further allow a user to share configurations with other users, manipulate configuration hierarchies (e.g., by flattening a hierarchy), etc., without departing from the spirit of the invention.

Figure 8A:
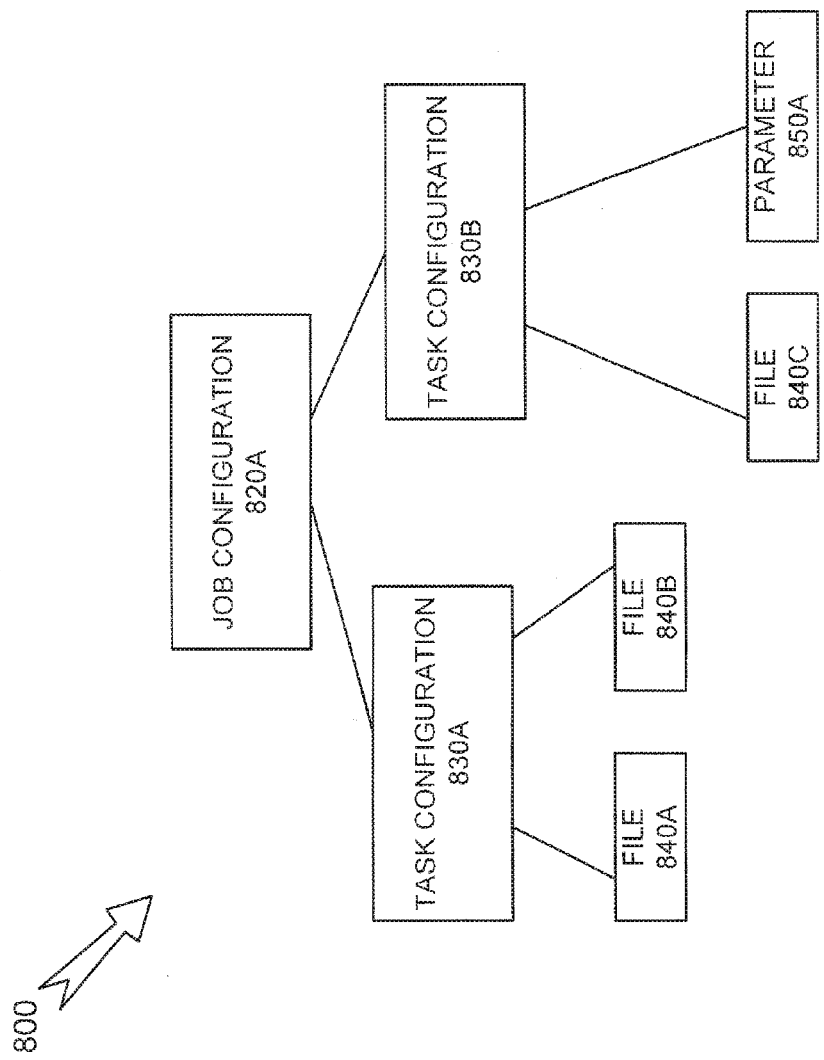
FIGS. 8A and 8B illustrate exemplary hierarchical arrangements of configurations that can be used with embodiments of the invention.
Figure 8B:
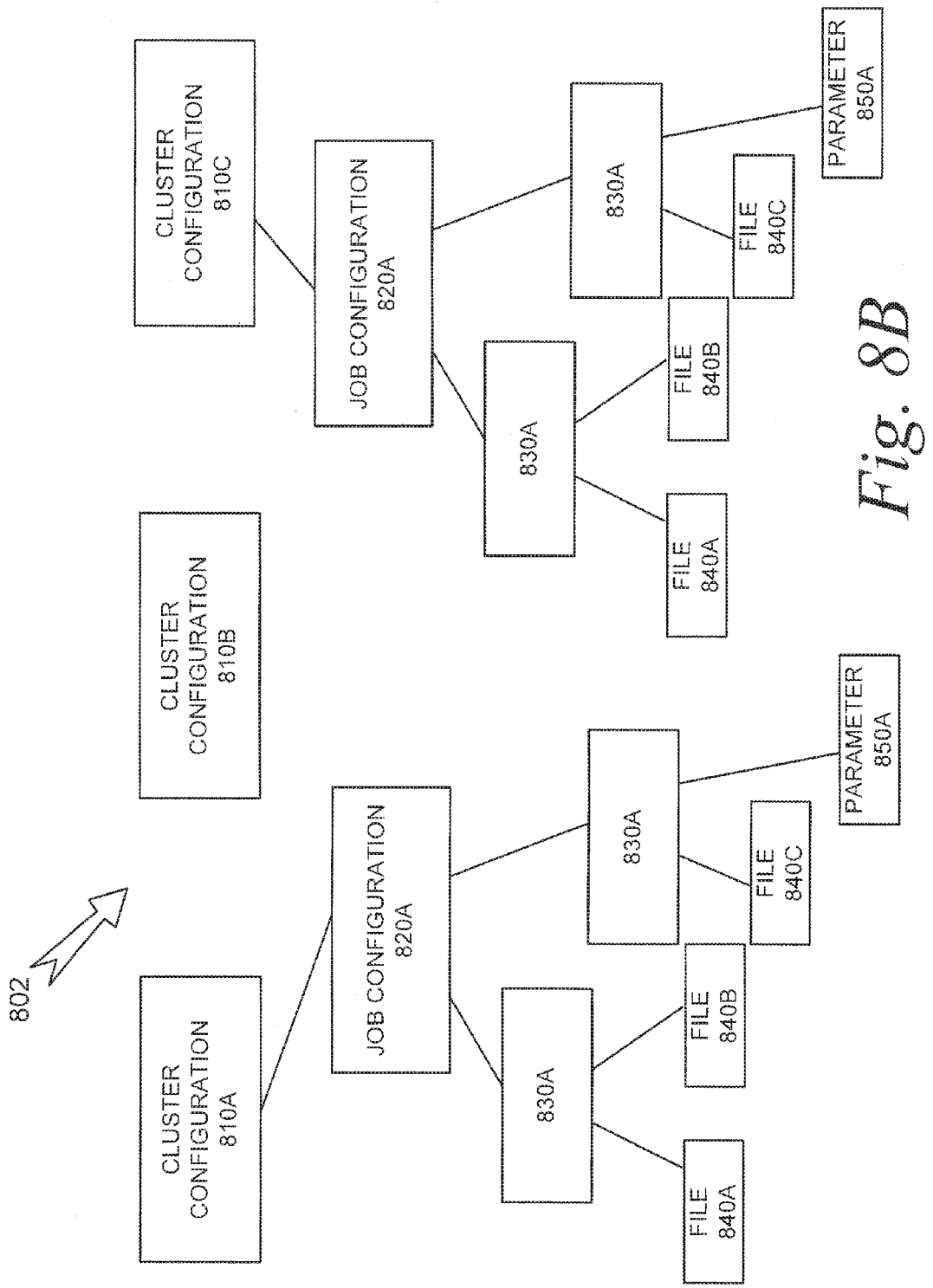

FIGS. 8A and 8B illustrate exemplary arrangements of configurations that can be used with embodiments of the invention. Configurations can have relationships with each other, such as hierarchical relationships. For example, and referring to FIG. 8A, configuration 800 may include a job configuration 820A, task configurations 830A and 830B, files 840A, B, and C, and parameter 850A. In configuration 800, job configurations 820A and 820B may contain information identifying how a job is configured for execution in a distributed computing environment. Job configuration 820A may include two task configurations 830A and 830B, respectively, that contain information identifying how tasks included in job 820A will be executed in the distributed computing environment. In configuration 800, job configuration 820A may be considered a parent of a configuration residing at a hierarchy level that is beneath job configuration 820A. For example, job configuration 820A may be a parent with respect to task configurations 830A and 830B. Relationships among configurations may be referenced using other terminologies if desired. For example, configuration 820A may be an ancestor with respect to configurations located beneath configuration 820A (e.g., configurations 830A, 830B, 840A, etc.)

Task configurations 830A and 830B may include one or more files, such as file 840A and 840B that are used by the task when the task is executed. Task configurations, e.g., configuration 830B, may further include parameters, such as parameter 850A, that are used with a task when the task in the distributed computing environment.

Exemplary embodiments allow a user to configure distributed computing environments without having to manually recreate information needed for performing processing tasks in the environment. For example, an embodiment of the invention allows a user to create one or more job configurations and then use the job configurations with one or more cluster configurations without having to manually create a configuration by entering information for the cluster configuration, the job configuration, the task configuration, files, and/or parameters using a keyboard or other type of user input device.

Referring to FIG. 8B and configuration 802, a user may create a first cluster configuration 810A, a second cluster configuration 810B, and a third cluster configuration 810C, where each cluster configuration identifies workers and other resources and/or information that can be used to perform processing operations in a distributed computing environment. The user may take a job configuration, e.g., configuration 820A, and may associate the job configuration with one or more cluster configurations without having to manually create a configuration for each cluster from scratch. For example, the user may associate job configuration 820A with cluster configuration 810A and with cluster 810C because these two cluster configurations include a distributed processing capability that is adequate to process tasks included in the job associated with job configuration 820A.

Configurations, such as those illustrated in FIGS. 8A and 8B can be imported from or exported to other devices, applications, interfaces, etc. For example, a user may enter a command into client 150 that causes cluster configuration 810A (FIG. 8B) and its job and task configurations to be exported to a file that can be sent to a destination via an email message. Embodiments may further allow hierarchically related configurations to be flattened to facilitate use of the configuration by other devices and/or applications as desired. For example, cluster configuration 810A (FIG. 8B) may be flattened and attached to an email message that can be sent to a recipient device and/or to allow a user to employ the configuration without, having a valid parent configuration included in the hierarchy.

Arrangements of configurations may further cause a portion of a hierarchy to be updated when a change is made to one of the configurations in the hierarchy. For example, a configuration hierarchy that includes a cluster configuration as a parent may be configured so that a change to the parent is propagated to children in the hierarchy, such as job or task configurations. Embodiments can be configured to check the parent configurations and/or child configurations periodically or upon occurrence of an event for updates. For example, a parent configuration may be checked once per day for updates or may be checked for updates at runtime. Embodiments may further support configuration hierarchies that are upgraded to be compatible with new releases of software for client 150, workstation 170, workers 710, etc.

Figure 9A:
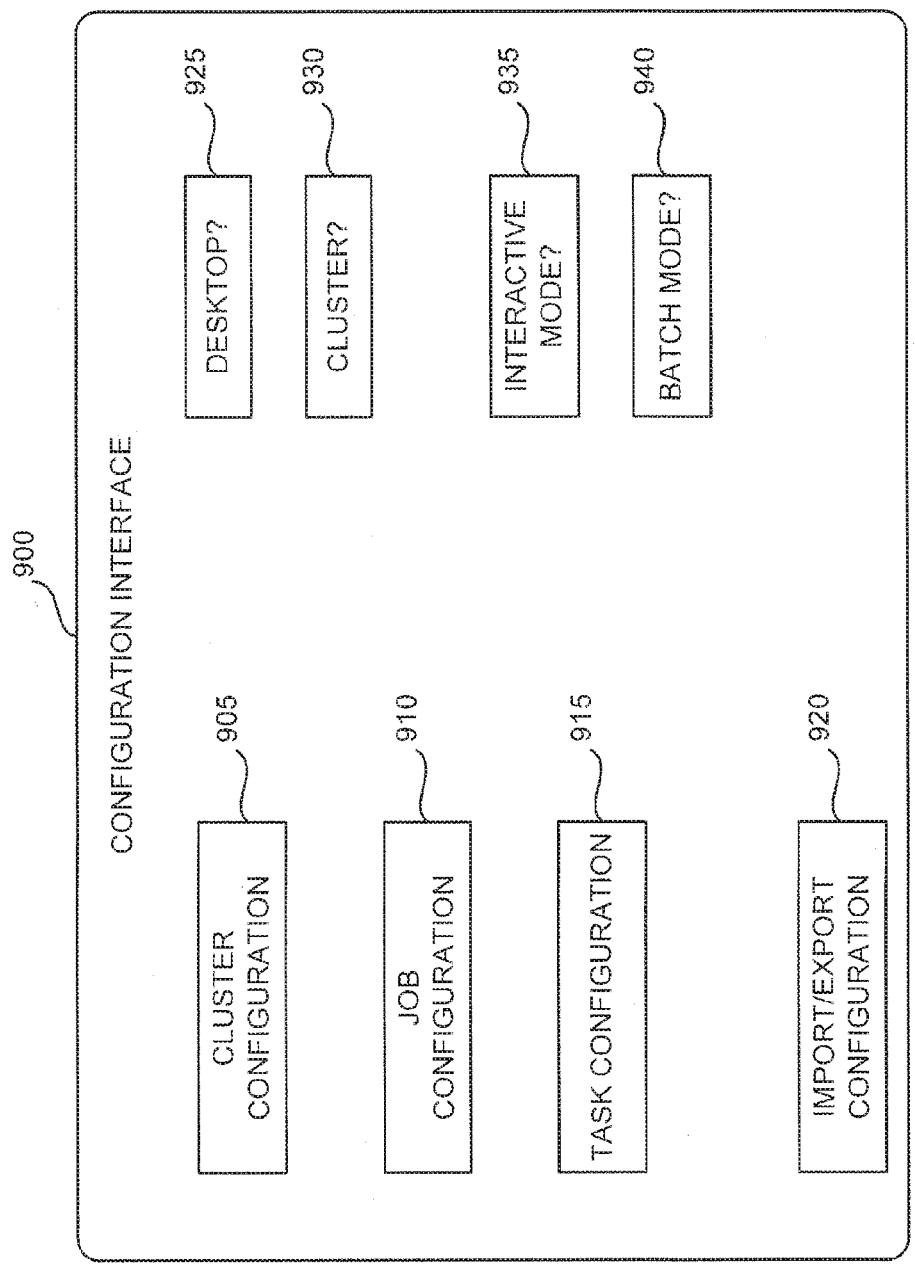
FIGS. 9A and 9B illustrate exemplary user interfaces for interacting with configurations consistent with principles of the invention.

Embodiments of the invention can employ user interfaces for allowing users to create, modify, save, etc., configurations. For example, FIG. 9A illustrates an exemplary user interface that can be used to interact with configurations. UI 900 may include mechanisms, such as buttons, for cluster configuration 905, job configuration 910, task configuration 915, import/export configuration 920, desktop 925, cluster 930, interactive mode 935 and batch mode 940. In an embodiment, a user may select one or more buttons using a pointing device, such as a mouse, and may enter information related to the selection.

Cluster configuration 905 may provide a user with information regarding a cluster configuration. For example, a user may be able to enter information regarding a cluster that will perform distributed processing activities on behalf of a client 150. Job configuration 910 may provide a user with information regarding the configuration of one or more jobs that can be ran in a cluster identified in cluster configuration 905. Task configuration 915 may provide a user with information about tasks that will be executed in a cluster. Task configuration 915 may allow a user to enter file names associated with a task and/or parameters for a task.

Import/export button 920 may be selected by a user to export a cluster, job, and/or task configuration to a destination, such as a file, a remote device, an email message, etc.

Desktop 925 may allow a user to indicate whether a specified configuration should be applied to a desktop environment on client 150. For example, embodiments of the invention may allow a user to specify a cluster configuration that includes job and/or task configurations. Embodiments may further let the user test the configuration on his/her desktop computing environment before attempting to deploy the configuration in a distributed computing environment, such as a cluster, cloud, or computing grid. The desktop environment may allow the user to emulate the configuration by executing tasks of the configuration in the desktop environment. For example, the desktop environment can be used to process a portion of a data set that will eventually be run in the distributed computing environment. When the user is satisfied that a configuration will provide acceptable performance and/or a result, the user may deploy the specified configuration onto system 200/700 for performing distributed processing of a job.

An exemplary embodiment may allow the user to select cluster button 930 to deploy the specified configuration on system 200/700. For example, a configuration file may include a flag or other parameter that can have a first setting, or value, for deploying the configuration on the user's desktop environment. The flag/parameter can have a second setting/value for deploying the configuration in a distributed computing environment. Selecting cluster button 930 may change the flag/parameter from the first setting/value used to run the configuration on the desktop environment to the second setting/value to run the configuration in the distributed computing environment. Exemplary embodiments allow a user to deploy a configuration in a local (desktop environment) or a distributed environment without having to rewrite or change detailed aspects of the configuration file or modify program, code that interacts with distributed computing resources.

Exemplary embodiments may further allow a user to make a selection to select performing distribute processing in an interactive mode or a batch mode. For example, UI 900 may allow a user to select an interactive mode button 935 to perform interactive distributed processing. UI 900 may further allow the user to select batch mode button 940 to perform batch-based distributed processing.

Figure 9B:
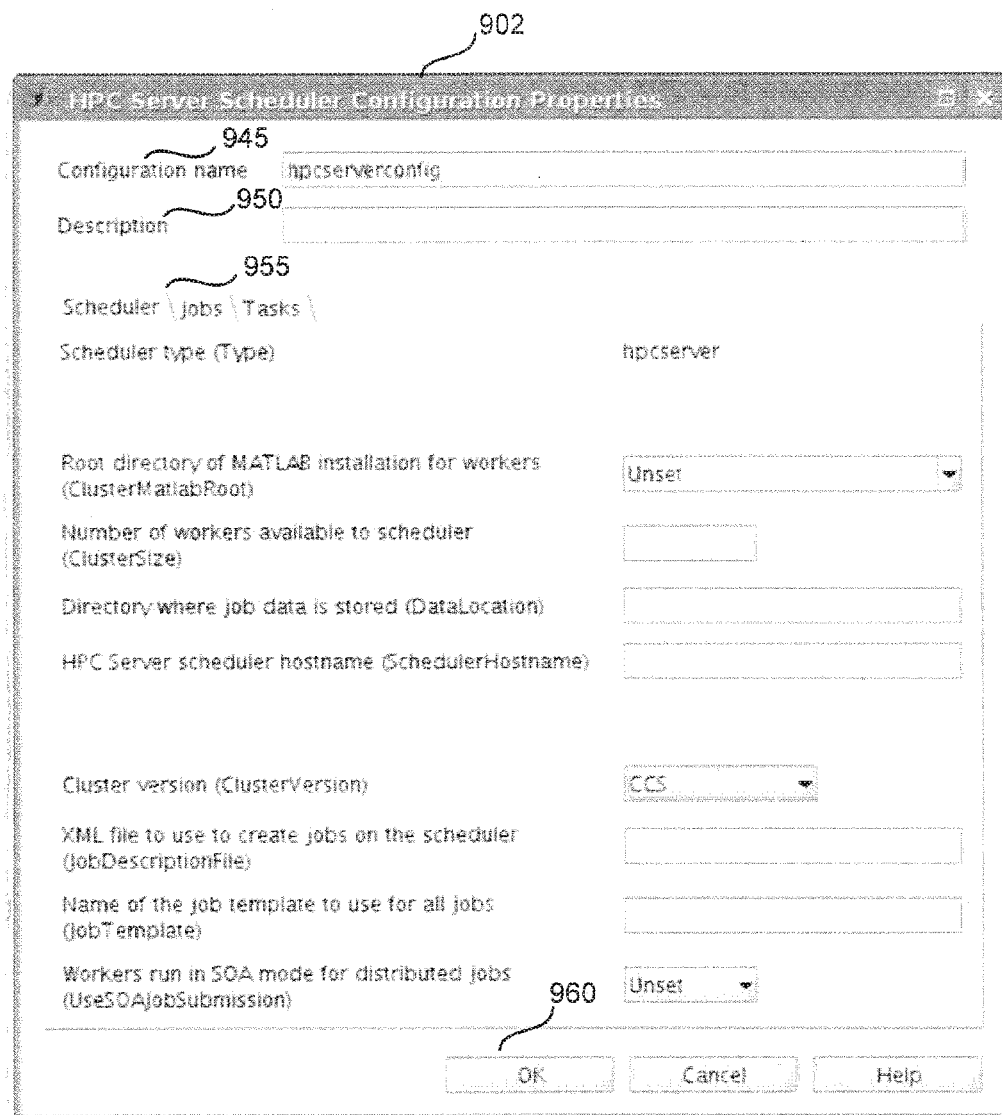

Embodiments of UI 900 may take forms that differ from the example of FIG. 9A. For example, FIG. 9B illustrates UI 902 that may be adapted for a particular type of scheduler, such as an HPC server scheduler. UI 902 may include a configuration name field 945 for specifying a name of a configuration to test on a desktop computing environment or to deploy in a distributed computing environment. Description field 950 may include information that describes a configuration specified in field 945.

UI 902 may further include tabs 955 that can be selected by a user to bring a group of fields associated with an aspect of a configuration to the foreground of a display. In an embodiment, the user may be able to interact with a tab that is in the foreground. In an embodiment of the invention, a tab at the foreground may be referred to as an active tab, while tabs in the background may be referred to as inactive tabs.

In FIG. 9B, a scheduler tab may be the active tab and may allow a user to specify information related to the type of scheduler being deployed in a distributed computing environment. For example, the scheduler tab may include fields for specifying a direction for an installation of a technical computing environment used to facilitate distributed computing operations, a number of workers available to perform computing activities, a directory name as to where data is stored, a host name for a scheduler, a version name for a cluster, a file used to create jobs on a scheduler (e.g., an XML file name), a name of a job template to use for jobs, and workers ran in certain modes for job that can be distributed in system 200.

UI 902 may further include buttons 960 for allowing a user to accept information in UI 902, such as an OK button, for allowing a user to cancel out of UI 902, such as Cancel button, or for allowing a user to get assistance regarding interacting with UI 902 or other aspects of a distributed computing environment, such as Help button.

UI 902 may be configured to operate as a configuration wizard that guides users in setting up configurations for distributed computing activities. Embodiments of UI 902 may pre-populate fields in the interface based on a user's affiliation, a user's past selections, available workers, available software applications, available schedulers, etc. UI 902 may further be configured to perform verification operations on information entered by a user. For example, UI 902 may determine if any information entered by a user or pre-populated by the system conflicts and/or produces an error. For example, UI 902 may produce an error or may correct conflicting information depending on how system 200 is configured.

Embodiments of the invention may be configured to traverse object hierarchies that include objects associated with configuring a distributed computing environment. Or, alternatively, embodiments may be configured so as not to traverse object hierarchies. For example, a configuration may be set on a scheduler object and a first embodiment may be configured to use jobs created on the scheduler so that the jobs also use the scheduler object. A second embodiment may be configured so that hierarchy traversal is not used, which would result in the jobs not using the scheduler object unless a user separately applied the configuration to the job.

Figure 10:
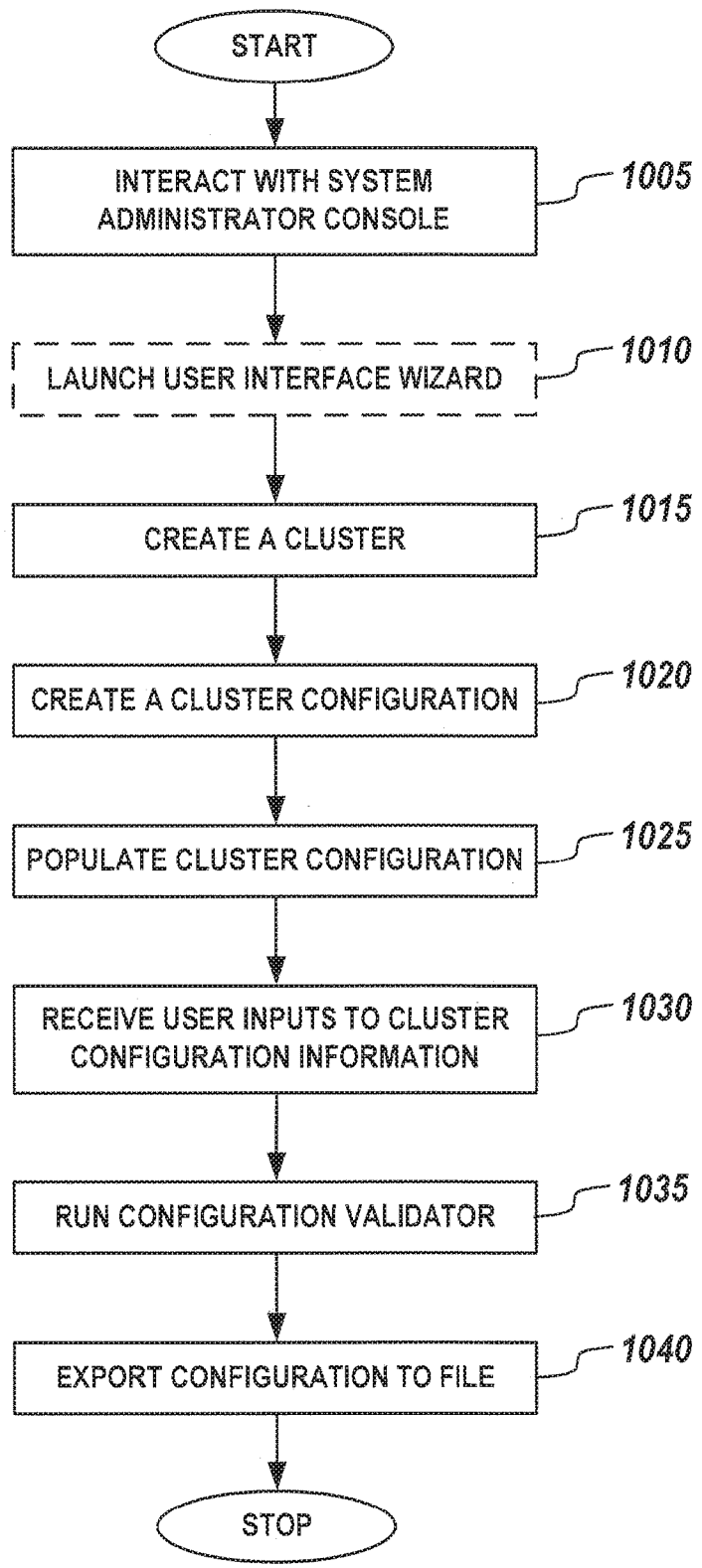
FIG. 10 illustrates exemplary processing for creating a cluster configuration consistent with principles of the invention.

FIG. 10 illustrates exemplary processing for creating a configuration file for use in a distributed computing environment. A user, such as a system administrator, may interact with a system administrator console (act 1005). For example, a system administrator may interact with a console connected to an administrator's workstation. In an embodiment, a user interface wizard may be launched (act 1010). An interface wizard may guide the system administrator in creating a configuration, such as an overall configuration that can include one or more cluster configurations. When an interface wizard is not used, the system, administrator may create a configuration by modifying an existing configuration and saving the modified configuration as a new configuration. Alternatively, the system administrator may manually create a new configuration from scratch.

The system administrator may create a cluster using the workstation and console (act 1015). The cluster may include two or more workers configured to perform distributed computing activities. The system administrator may create a configuration, such as an overall configuration that includes one or more cluster configurations for interacting with the cluster (act 1020). For example, the system, administrator may create a cluster configuration may populate the cluster configuration (act 1025). Populating the cluster configuration may include specifying properties for the cluster, indicating parent/child configuration relationships, etc. Embodiments may allow a system administrator to manually specify properties or may programmatically populate cluster configurations. The system administrator may modify aspects of the configured, cluster when the initial cluster configuration is not acceptable (act 1030). For example, the system administrator may create a cluster configuration and may later decide that a job configuration and a task configuration should be added to the cluster configuration. The system administrator may add the job configuration and the task to the cluster configuration and may save the revised cluster configuration to a storage medium.

Exemplary embodiments may include a configuration validator that can be run to detect errors in a configuration, such as a cluster, job or task configuration (act 1035). When the system administrator is satisfied with the configuration, the system administrator may export the configuration to a file (act 1040). The system, administrator may make the configuration file available to other users, such as a MATLAB user (MU).

Figure 11:
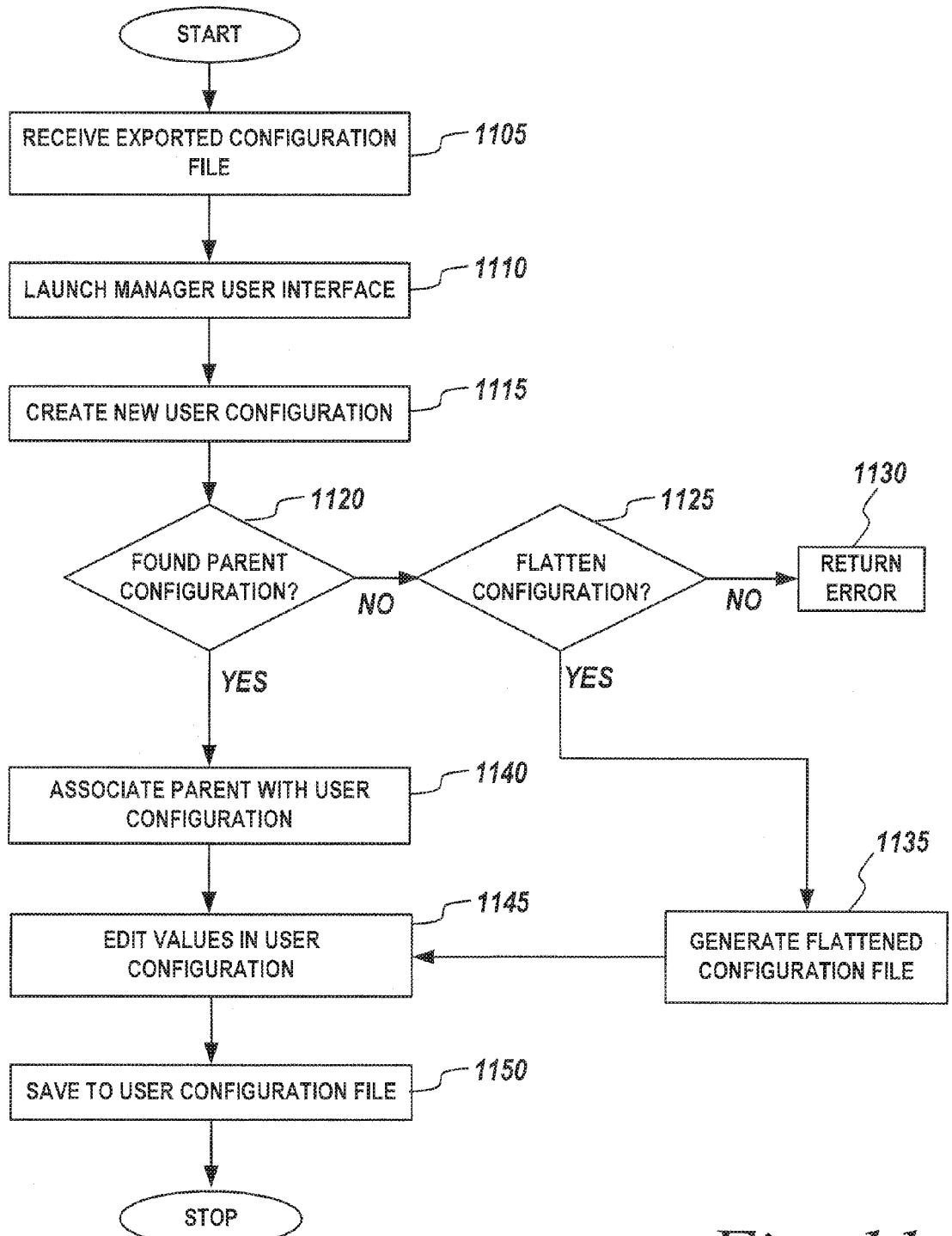
FIG. 11 illustrates exemplary processing for interacting with a received configuration.

FIG. 11 illustrates exemplary processing for creating a user configuration file, such as a configuration file used by an MU. A user may receive an exported configuration file, such as a cluster configuration file (act 1105). For example, the MU may receive a cluster configuration file via an attachment to an email message, via a link in an email message, by going to a web site and retrieving a file, etc. The MU may launch a user interface, such as a manager user interface, that allows the MU to interact with the configuration file and/or other aspects associated with creating, exiting, importing, exporting, etc., configurations on behalf of the MU (act 1110).

The MU may create a new user configuration using the user interface (act 1115). For example, the MU may use the received configuration file as a basis on which to add additional configuration information unique to the MU. For example, the MU may wish to use a subset of available workers specified in the received configuration file, may wish to change a user priority in the received configuration, etc. Exemplary embodiments may allow a user to work with a hierarchy of configurations for performing distributed processing activities. For example, a user may receive a configuration file that includes a configuration that can serve as a parent configuration. The user may add additional configurations, such as sub-cluster, job, or task configurations that can act as child configurations and/or grandchild configurations to the parent configuration.

Once the user has created a new configuration at act 1115, a determination may be made as to whether a parent configuration was found (act 1120). When a parent configuration is not found, the user may be asked if he wishes to flatten the configuration so that it does not include a hierarchy of configurations (act 1125). When no parent configuration is found and the user does not wish to flatten the configuration, an error may be returned to the user (act 1130). In contrast, when the user indicates that the configuration should be flattened at act 1125, a flattened configuration file may be generated on behalf of the user (act 1135).

Returning to act 1120, when a parent configuration is found, the parent configuration may be associated with the configuration created by the user (act 1140). The user may wish to edit values in the hierarchical configuration or flattened configuration (when act 1135 is encountered). The user may edit configuration values when desired (act 1145). The user configuration file may be saved when the user is satisfied with the contents of the file (act 1150).

Figure 12A:
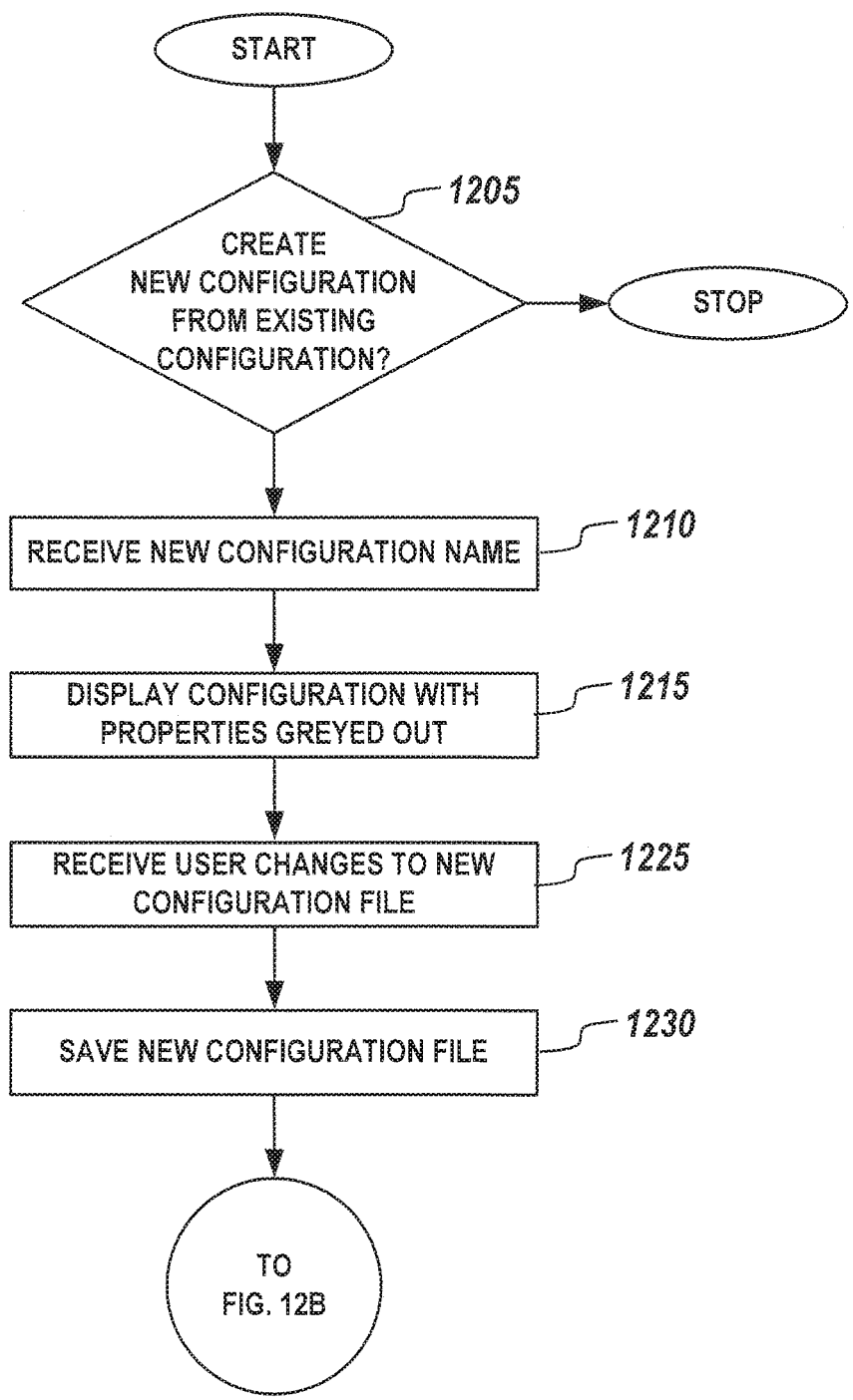
FIGS. 12A and 12B illustrate exemplary processing for creating a new configuration from an existing configuration and for creating a configuration alias.
Figure 12B:
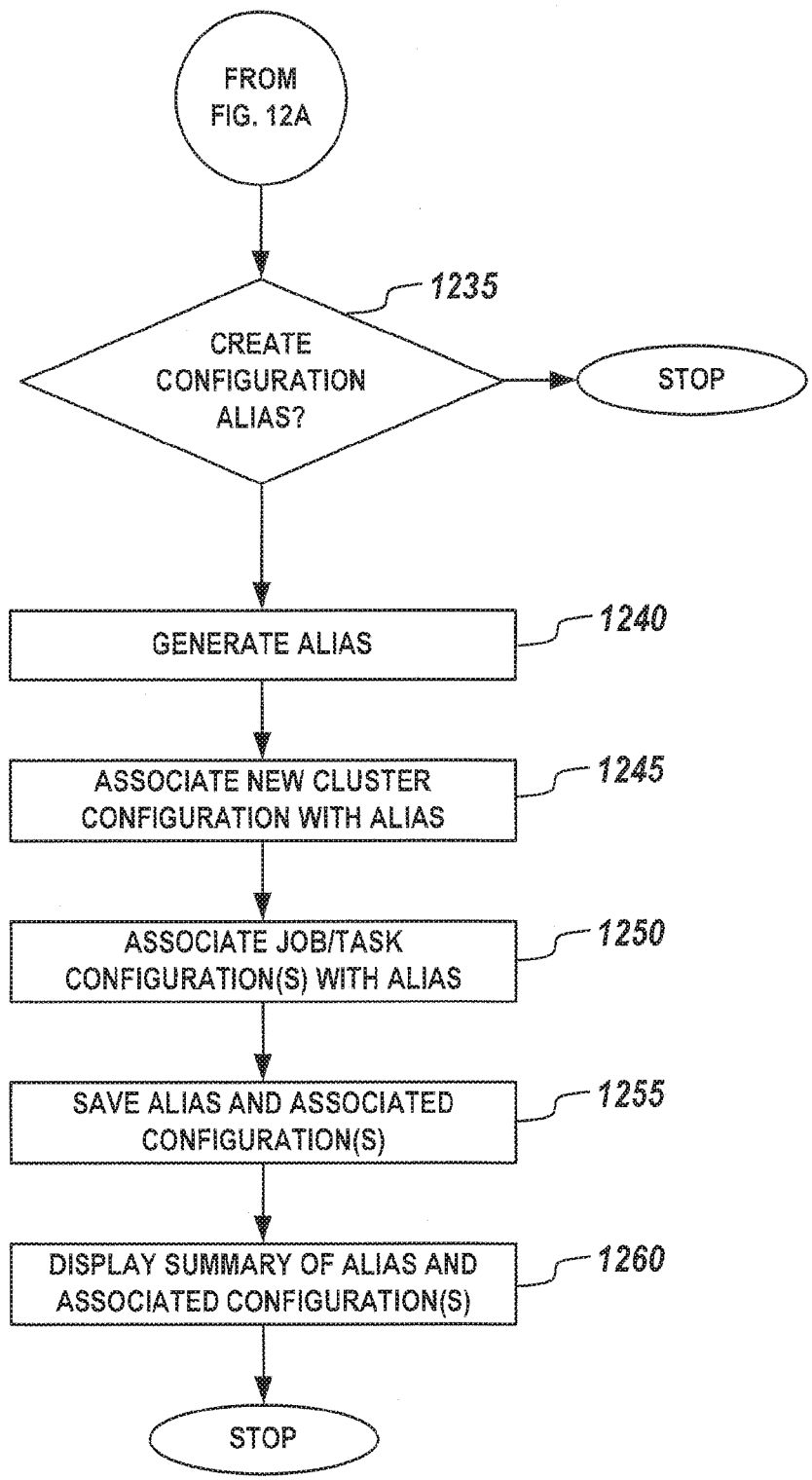

FIGS. 12A and 12B illustrate exemplary processing for creating a new configuration from an existing configuration and for creating an alias for the new configuration. Referring to FIG. 12A, a determination may be made as to whether a user wishes to create a new configuration from an existing configuration (act 1205). For example, an MU may wish to create a new configuration to allow the user to install or remove workers in a cluster or on his desktop (e.g., when simulating a cluster that will be used for distributed processing on behalf of the user). When the user wishes to create a new configuration from an existing configuration, the user may enter a name for the new configuration (act 1210). For example, the user may be provided with a field in a UI in which to enter the name of the new configuration. In an alternative embodiment, a system may programmatically generate a new configuration name and the user may be able to modify the name when desired.

Details of the new configuration may be displayed to the user with properties shaded, e.g., grayed out (act 1215). In an embodiment, the shaded properties may be set to the same values as those of a parent configuration associated with the new configuration. The user may edit values in the new configuration using an input device, such as a keyboard and/or mouse (act 1220). In an embodiment, the new configuration may be adapted to update whenever its parent is updated (act 1225). For example, when a value in the parent configuration is changed, a corresponding value in the new configuration may automatically change. In an embodiment, the parent configuration may be updated at determined intervals, such as once per hour, day, week, etc. In this embodiment, the new configuration may update when the parent has updated. The user may save the new configuration when the user is satisfied with how the new configuration is arranged (act 1230).

Referring now to FIG. 12B, in some instances a user may wish to create one or more aliases with which to refer to a configuration. FIG. 12B illustrates exemplary processing that can be used with an embodiment to establish an alias for a configuration. A determination may be made as to whether a user wishes to create a configuration alias (act 1235). For example, the user may make a selection using a keyboard that indicates an alias should be created. When it is determined that an alias should be created, a system may generate an alias name for the configuration (act 1240). The system may associate a new cluster created by the user with the alias (act 1245). For example, a configuration alias may allow a user to take a cluster configuration and combine it with any number of job configurations or task configurations. Embodiments of the invention can operate with configurations that are of the same type or that are of different types.

The alias and configurations associated with the alias may be saved (act 1255). The user may use the alias to interact with the associated configuration to allow the user to perform distributed processing by using a shorthand notation that refers to the configuration. In an embodiment, a UI may be used to display summary information, about the alias and its associated configuration to the user (act 1260). The configurations associated with the alias may allow the user to perform interactive or batch-based distributed processing depending on the details of a particular configuration.

Figure 13A:
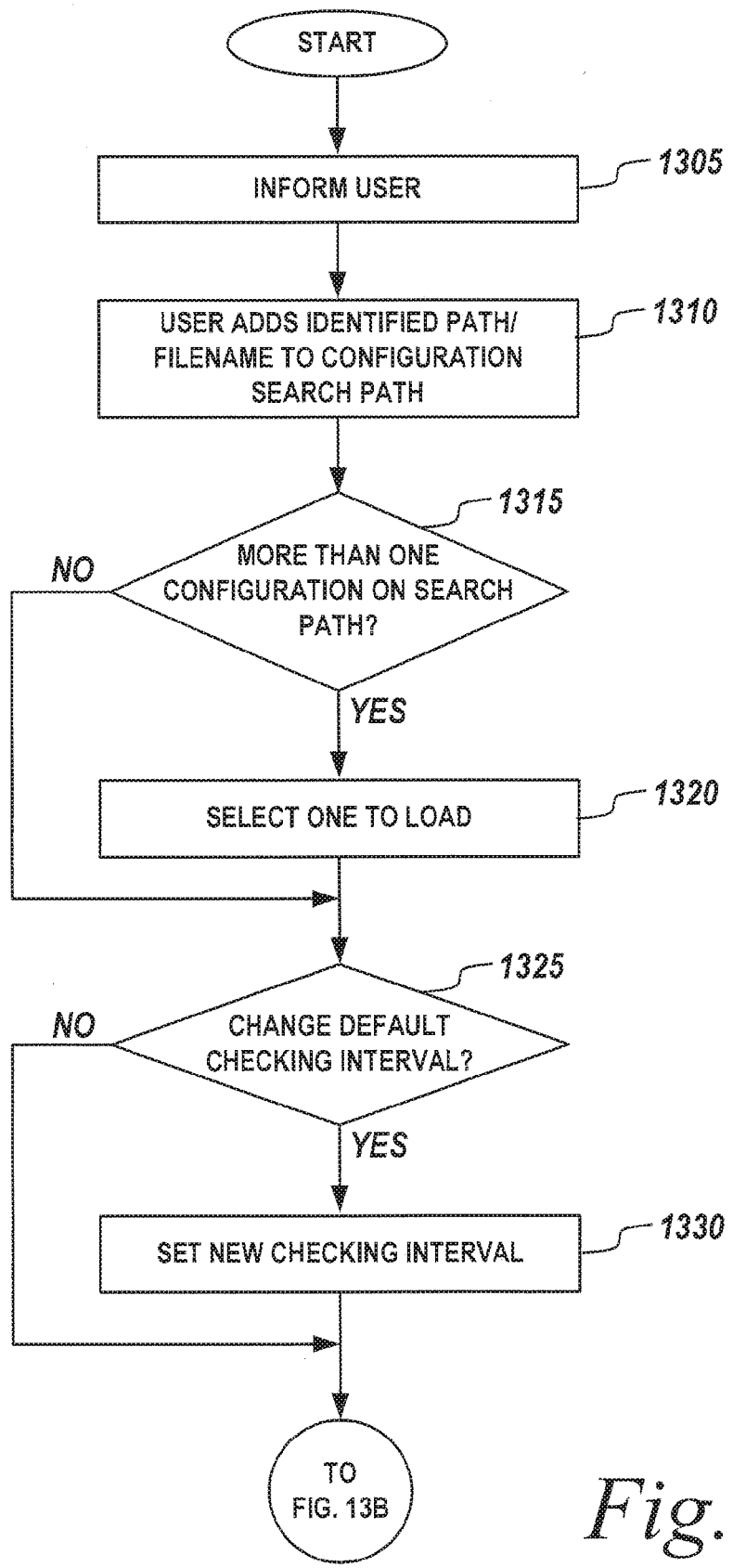
FIGS. 13A and 13B illustrate exemplary processing for creating and using a configuration search path with an embodiment of the invention.
Figure 13B:
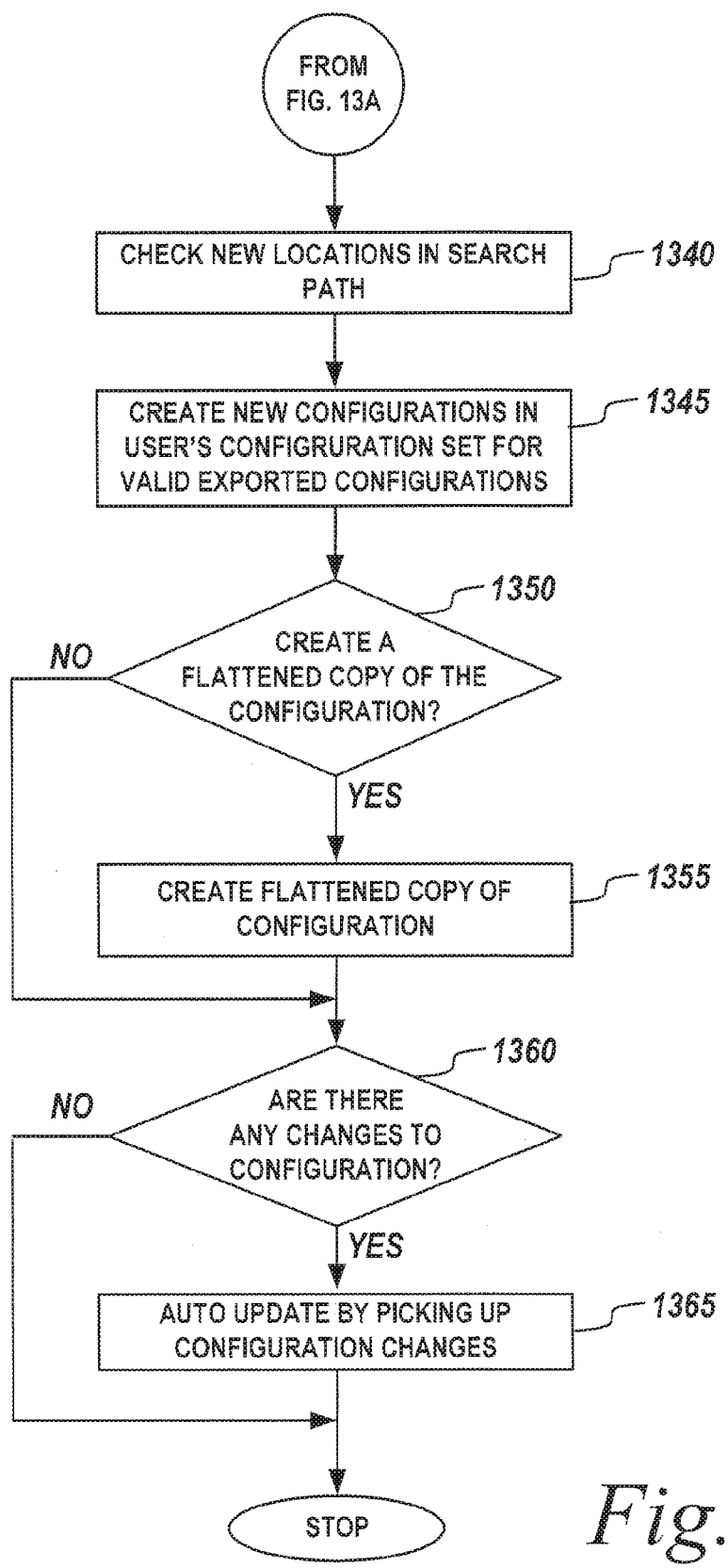

Exemplary embodiments may allow users to access hierarchical configurations via an identifier, such as a filename, path name (e.g., URI, directory path, link, etc.). FIGS. 13A and 13B illustrate exemplary processing that can be used to access a configuration using a path name.

Referring to FIG. 13A, a user may be informed about an identifier that allows the user to access a configuration, such as a configuration file located on a remote device connected to a network (at 1305). In an embodiment, the user may receive an email message that includes a path name, such as a URI. The user may add the path/filename to a configuration search path associated with a computer operated by the user (act 1310). In alternative embodiments, the path name can include a directory path name, a registry entry, an active directory, a file name, etc.

In some instances a user may have access to more than one search path and/or to multiple configurations on a particular search path. In these instances, a determination may be made as to whether there is more than one configuration available on a search path (act 1315). For example, a system administrator may have set up several configurations that use various clusters for performing distributed processing activities, and the system administrator may provide the user with a URI that is associated with the several configurations.

When multiple configurations are available, the user may select one configuration to load for a distributed processing application (act 1320). Embodiments may provide for a default checking interval at which the user's computer checks for updates to one or more configurations associated with search paths. When a default checking interval is provided (e.g., once per day, hour, minute, etc.) a determination may be made as to whether the user wishes to change the default checking interval (act 1325). When the user wishes to set a new checking interval, a new interval may be set (act 1330).

Now referring to FIG. 13B, the user's computer may check new locations in the search path for configurations that can be used on behalf of the user (act 1340). One or more available configurations may be used to create at least one configuration in a configuration set associated with the user (act 1345). In an embodiment, new configurations may only be created for valid exported configurations (act 1345). Embodiments may use a configuration search path to read settings of an application and then build on those settings when creating a configuration for the user.

For example, a search path may query a version of a MATLAB programming application and may read a settings API associated with the application. For example, an identifier for a storage mechanism used by the MATLAB application may be read via the search path. Search paths that interact with APIs may interact with APIs having a single layer or multiple layers, e.g., an API having a factory layer, a workgroup layer, a user layer, etc. Exemplary embodiments can further work with APIs having permissions with respect to settings in the API, such as read permissions, write permissions, copy permissions, delete permissions, etc.

When a new configuration is created, the user may be queried as to whether a flattened copy of the configuration should be created (act 1350). When the user wishes to create a flattened copy of the configuration, the user's computer, or another device on the network, may create a flattened copy of the configuration (act 1355). A determination may be made as to whether there are any changes to the configuration created on behalf of the user (act 1360). When changes are detected, the user's configuration may be automatically updated using an auto-update routine. In exemplary embodiments, the auto-update routine may pick up and install configuration changes on a computer associated with the user (act 1365).

Embodiments of the invention can make use of one or more application program interfaces (APIs) to facilitate creation and use of flat or hierarchical configurations in distributed computing environments. For example, APIs consistent with the principles of the invention can facilitate creating a new configuration from scratch, adding a location to a configuration search path, importing a configuration from a file, exporting a configuration, creating a new configuration from, an existing configuration, etc. Exemplary APIs can further support arranging cluster configurations, job configurations and/or task configurations in hierarchies.

FIGS. 14A-14I illustrate exemplary aspects and implementations of APIs that, can be used for implementing aspects of the invention. FIG. 14A illustrates public fields that can be used with a cluster configuration class in an embodiment of the invention. FIG. 14B illustrates exemplary public methods that can be used with the configuration class in exemplary embodiments of the invention, and FIG. 14C illustrates private fields that can be used with the configuration class.

FIG. 14D illustrates public fields and public methods that can be used with a job/task configuration class in exemplary embodiments of the invention, and FIG. 14E illustrates exemplary public fields that can be used with the job/task configuration class.

FIG. 14F illustrates configurations set static methods that can be used with exemplary embodiments of the invention. FIGS. 14G, H and I illustrate exemplary public fields, public methods, and private fields, respectively, for an exemplary configuration search path that can be used with embodiments of the invention.

Exemplary embodiments of the invention may be used to support a range of use cases and hardware and software configurations encountered by users of distributed computing applications.

In an exemplary use case, Steve may be a system administrator (SA), Steve may create two configurations, JMConfig1 and HPCSConfig1, that target the two clusters that Steve manages. For JMConfig1, Steve may set the DefaultTimeout property to 1 hour to discourage users from, running lengthy jobs, Steve may export both configurations to files, such as .mat files, in a shared directory. In this workflow, the shared directory is referred to as: \\public\schedulerConfigs.

Steve may inform a user, Mark, about the new configuration files. For example, Mark may be a MATLAB user (MU) and Steve may request that Mark add the \\Public\schedulerConfigs location to his Configurations Search Path. When Mark performs the requested operation, JMConfig1 and HPCSConfig2 are the only configurations in the directory.

For example, Mark may not have any existing configurations in his Configurations Set. Mark may open the Configurations Search Path dialog and may add \\public\schedulerConfigs to the end of the list. Before clicking "OK", Mark may check that he has chosen the "parse the Configurations Search Path when I click OK" option. He clicks OK.

A parallel computing toolbox (PCT) may query \\public\schedulerConfigs location and may find two valid exported configurations. These configurations may be programmatically loaded into a configuration UI with the names JMConfig1 and HPCSConfig2. Mark may see JMConfig1 and HPCSConfig2 in the configuration UI. Mark may inspect JMConfig1 and may see that its parent is \\public\schedulerConfigs\JMConfig1.mat. Mark may also inspect HPCSConfig2 and see that its parent is \\public\schedulerConfigs\HPCSConfig2.mat. From the configurations' descriptions, Mark knows that JMConfig1 is the cluster to use for projects 1A and 1B and HPCSConfig1 is the cluster to use for projects 2A and 2B.

Upon further inspection, Mark may determine that JMConfig1 has its DefaultTimeout property set to a value that far exceeds Mark's needs for project 1A, but is too short for project 1B. Mark may decide to create a duplicate of JMConfig1 and call it JMConfig1B, preserving the configuration hierarchy during the duplication process. Like JMConfig1, the parent for JMConfig1B is \\public\schedulerConfigs\JMConfig1.mat. Mark may change the DefaultTimeout value for JMConfig1B to 2 hours. Mark may then change the name of JMConfig1 to JMConfig1A to maintain naming consistency. In addition, Mark may change the DefaultTimeout value to 30 minutes for JMConfig1A.

The SA, Steve, may tell Mark to use the JobTemplate named SpecialTemplate for projects 2A and 2B. The use of SpecialTemplate may ensure that the correct (e.g., $3^{rd}$ party) software licenses are available to the workers for projects 2A and 2B. Since this JobTemplate is only to be used by those working on projects 2A and 2B, Steve has not used this value in the more general-purpose HPCSConfig1.

In keeping with Steve's instructions, Mark changes the JobTemplate value in HPCSConfig1 to SpecialTemplate. Mark may also have description files jobDescription2A.xml and jobDescription2B.xml that he needs to use for projects 2A and 2B. Mark may create two new configurations using HPCSConfig1 as a parent and sets the different JobDescriptionFile values for the resulting configurations. These are HPCSConfig1A and HPCSConfig1B.

Mark's configurations may be represented hierarchically, where * denotes configurations visible to Mark in the UI:

-\\public\sharedConfigurations\JMConfig1.mat
  -JMConfig1A *
  -JMConfig1B *
- \\public\sharedConfigurations\HPCSConfig2.mat
  - HPCSConfig2 *

```
    - HPCSConfig2A *
    - HPCSConfig2B *
```

In an exemplary embodiment, the next time that Mark's configurations are updated from the Configurations Search Path, the PCT may detect that both JMConfig1.mat and HPCSConfig2.mat are already the parents of existing configurations in Mark's Configurations Set, so no further configurations are created.

Mark may work with colleagues Mabel and Mary that both may wish to use his version of JMConfig1A. Mark may export JMConfig1A to c:\myconfigs\JMConfig1A.mat on his hard drive. This exported version of JMConfig1A preserves the parent value of \\public\sharedConfigurations\JMConfig1.mat.

Mark may know that Chris, a contractor, will need to access HPCSConfig2A. Mark may export HPCSConfig2A to c:\myconfigs\HPCSConfig2A.mat. This exported version of HPCSConfig2A preserves the parent values of Mark's HPCSConfig2 and also includes HPCSConfig2, since HPCSConfig2 is a configuration that is in Mark's Configurations Set.

Mark may have access to two computers that he regularly works on, such as his desktop machine and his laptop. Thus far, Mark may have been using only his desktop machine to run his applications on a cluster. However, Mark may be travelling and may be planning on working from another site for a few weeks. During this time, Mark may need to be able to run his applications for project 2A using his laptop. The other site is part of the same organization that Mark works for, so he will have full access to all shared locations while working remotely.

Mark has already exported his version of HPCSConfig2A, as discussed above, and decides that he will adopt the practice where his desktop machine is the "master" and his laptop is the "slave". In other words, Mark has anticipated that any changes to HPCSConfig2A will occur only on his desktop machine. Mark has also determined that he will use, but not modify, HPCSConfig2A on his laptop. Mark decides that the easiest way to do this is to take his exported HPCSConfig2A.mat file and copy it to his public drive so that he can access it directly from there on his laptop. Mark may copy c:\myconfigs\HPCSConfig2A.mat to \\public\Mark\project2A\HPCSConfig2A.mat.

At the laptop, Mark may add \\public\Mark\project2A\HPCSConfig2A.mat to his Configurations Search Path. In this example, there are no other locations in Mark's Configurations Search Path. Before clicking "OK", Mark may confirm, that he has chosen the "parse the Configurations Search Path when I click OK" option. Mark may then click OK to have his selection accepted.

The PCT may query the \\public\Mark\project2A\HPCSConfig2A.mat location and may find that it is a valid exported configuration file. The valid configuration file may be programmatically loaded into the configuration UI, and configurations with names HPCSConfig2A and HPCSConfig2 may be created, Mark may inspect his new HPCSConfig2A configuration and sees that its parent is HPCSConfig2. HPCSConfig2 has the parent \\public\Mark\project2A\HPCSConfig2A.mat.

Mark's laptop's configurations may be arranged in a hierarchy and may be arranged as follows, where * indicates configurations visible to Mark in the UI:

```
-\\public\sharedConfigurations\HPCSConfig2.mat
  -\\public\Mark\project2A\HPCSConfig2A.mat
    -HPCSConfig2 *
      -HPCSConfig2A*
```

Mary may collaborate with Mark on Project 1A. Mark may need for Mary to be able to access the same Jobmanager cluster as him and would prefer that Mary keeps the same timeout values as him. Mark may also know that he may modify JMConfig1A again in the future, and would like Mary to receive these updates, Mark may determine that the easiest way to do this is to take his exported JMConfig1A.mat file and copy it to his public drive so that Mary can access it directly from there, Mark may copy c:\myconfigs\JMConfig1A.mat to \\public\Mark\project1A\JMConfig1A.mat. Mark may inform Mary to add this location to her Configurations Search Path.

Mary may not have any existing configurations in her Configurations Set and may not have any other locations on her Configurations Search Path. Mary may open the Configurations Search Path dialog and may add \\public\Mark\project1A\JMConfig1A.mat to the list. Before clicking "OK". Mary confirm that she has chosen the "parse the Configurations Search Path when I click OK" option, and may click OK.

The PCT may query the \\public\Mark\project1A\JMConfig1A.mat location and find a valid exported configuration. The valid configuration may be pro grammatically loaded in the configuration UI with the name JMConfig1A.

In an embodiment, Mary may be prompted with the dialog shown below during the programmatic creation of JMConfig1A:

"The configuration in \\public\Mark\project1A\JMConfig1A.mat has a parent configuration \\public\sharedConfigurations\JMConfig1.mat. Would you like to update from this configuration now?" [Yes/No] or [Always do the selected action for imported configurations checkbox]

Mary may select the "Always do the selected action for imported configurations" box and may select OK. The PCT may retrieve the latest property values from \\pubic\sharedConfigurations\JMConfig1.mat. Mary may inspect her new JMConfig1 configuration and may see that its parent is \\public\Mark\project1A\JMConfig1A.mat.

Mary's configurations may be arranged hierarchically and may be presented to her via the UI as follows where * indicates entries visible to Mary in the UI.

```
-\\public\sharedConfigurations\JMConfig1.mat
  -\\public\Mark\project1A\JMConfig1A.mat
    -JMConfig1A *
```

Mary may later decide that it is a good idea for her to add \\public\sharedConfigurations to her Configurations Search Path as well as using the configuration that Mark gave her. Mary may perform this action and her configurations may be arranged hierarchically as follows:

```
- \\public\sharedConfigurations\JMConfig1.mat
  -   JMConfig1 * (note: this entry is created as a result of the
      addition to the Configurations Search Path)
```

-continued

```
-\\public\Mark\project1A\JMConfig1A.mat
  -JMConfig1A * (this is the entry imported from Mark's
   configuration file)
- \\public\sharedConfigurations\HPCSConfig2.mat
  - HPCSConfig2 *
```

If Steve updates JMConfig1.mat with different property values, both Mary's JMConfig1 and JMConfig1A automatically receive these updates.

Another user, Mabel, does not work on the same project as Mark, but knows that he has experience with using a particular cluster, such as the JM cluster. After talking to Mark, Mabel realizes that makes JMConfig1A configuration would suit her needs perfectly and asks Mark to supply this configuration to her. Mabel happens to be working from home for a while and has experienced slow access to the shared network and unpredictable network performance in the past; however, Mabel has found that email access does not suffer when she works remotely. Mark decides that the easiest way to share his JMConfig1A with Mabel is to email her the JMConfig1A.mat file. In addition, Mark prefers that Mabel have her own copy of the .mat file because he knows providing Mabel with her own copy means she won't need to receive any updates from Mark, e.g., when Mark modifies property values in the configuration.

Mabel has no other configurations in her Configurations Set, and she takes the email attachment containing the configuration and imports it into her configurations. This creates a new configuration called JMConfig1A and she is prompted with the following dialog:

"JMConfig1A has a parent configuration
\\public\sharedConfigurations\JMConfig1.mat. Would you like to update from this configuration now?" [Yes/No] or [Always do the selected action checkbox]

Mabel selects the "always do the selected action for imported configurations" box and clicks Yes. The PCT goes away and retrieves the latest property values from \\public\sharedConfigurations\JMConfig1.mat. Mabel inspects her new JMConfig1 configuration and sees that its parent is \\public\sharedConfigurations\JMConfig1.mat.

Mabel's configuration may be arranged hierarchically and may be arranged as shown below, where * identifies entries visible to Mabel in the UI:

```
-\\public\sharedConfigurations\JMConfig1.mat
  -JMConfig1A *
```

After importing the configuration, Mabel may speak to Steve and decide that she wishes to add \\public\sharedConfigurations to her Configurations Search Path as well as using the configuration that Mark gave her. Since Mabel already has a configuration that uses \\public\sharedConfigurations\JMConfig1.mat as its parent, a new one for JMConfig1.mat is not created.

After performing the above operations, Mabel's configurations are arranged hierarchically as:

```
- \\public\sharedConfigurations\JMConfig1.mat
  -JMConfig1A * (this is the one imported from Mark's file)
- \\public\sharedConfigurations\HPCSConfig2.mat
  - HPCSConfig2 *
```

If Steve updates JMConfig1.mat with different property values, Mabel's JMConfig1A will automatically receive these updates.

A contractor, Chris, may be working with Mark on Project 2A. Chris may have limited access rights on the company's network and cannot access \\public\sharedConfiguration, but is able to access the cluster. Mark needs for Chris to be able to access the same HPCServer cluster as him, and decides that the easiest way to do this is to email Chris the exported version of HPCSConfig2A.

Chris has no other configurations in his Configurations Set. Chris takes the email attachment and imports it into his configurations. During the import, Chris sees the following message:

"Failed to access parent configuration
\\public\sharedConfigurations\HPCSConfig2.mat. Would you like to continue and use the cached values or abort the import?" [Use cached values/abort] or [Always do the selected action checkbox]

Chris may select "Abort" and talk to Mark. Mark, may inform Chris that he should select the "Use cached values" option instead. Chris does this and sees HPCSConfig2 and HPCSConfig2A appear in his configurations.

Below shows how Chris's configurations may look hierarchically (* indicates configurations visible to Chris in the UI):

```
- HPCSConfig2 *
  - HPCSConfig2A *
```

If Steve updates HPCSConfig2.mat with different property values, Chris's HPCSConfig2 does not automatically receive these updates since his HPCSConfig2 has no knowledge of the fact that it was once linked from HPCSConfig2.mat. In order for Chris to have the most up-to-date values for HPCSConfig2, Mark must ensure that he re-exports HPCSConfig2A.mat and emails it to Chris whenever he finds out that Steve has changed HPCSConfig2.mat.

In another scenario, a contractor, Carly, may be in a situation similar to the scenario above involving Chris except that she adds \\public\Mark\project2A\HPCSConfig2A.mat to her Configurations Search Path, but does not have access to \\public\sharedConfigurations. When the PCT parses the Configurations Search Path, the PCT may try to create HPCSConfig2 and HPCSConfig2A, but detects that it is not able to access HPCSConfig2.mat. Carly may be presented with the message below during the parsing of the Configurations Search Path:

"Failed to access parent configuration
\\public\sharedConfigurations\HPCSConfig2.mat for
\\public\Mark\project2A\HPCSConfig2A.mat.
\\public\Mark\project2A\HPCSConfig2A.mat will automatically be removed from your Configurations Search Path. Would you like to create a flattened copy of the configuration(s) in
\\public\Mark\project2A\HPCSConfig2A.mat?" [Yes/No] or [always do the selected action checkbox]

Carly selects "Yes" and HPCSConfig2 and HPCSConfig2A appear in her configurations. Carly's configurations may be arranged hierarchically as shown below (* indicates configurations visible to Carly in the UI):

```
                        - HPCSConfig2 *
                        - HPCSConfig2A *
```

If Steve updates HPCSConfig2.mat with different property values, Carly's HPCSConfig2 does not automatically receive these updates since her HPCSConfig2 has no knowledge of the fact that it was once linked from HPCSConfig2.mat. Furthermore, Carly does not receive any updates if Mark changes his HPCSConfig2A.mat since the Configurations Search Path no longer contains HPCSConfig2A.mat.

Exemplary embodiments can include configurations consistent with the principles of the invention that can be used to support computing arrangements such as grid computing infrastructures.

For example, a system administrator, Ed, may be responsible for administering a cluster that is part of the Enabling Grids for E-sciencE (EGEE) grid. Users of Ed's computing grid may be distributed worldwide and may not have access to a single shared file system. As a result, Ed may make configurations available via a website from which the users can download and share configurations. Ed may create a generic cluster configuration and export it to a filed named EGEEConfig.mat. Ed may place this exported file onto the website, along with instructions for users to add the http:// location to their Configurations Search Path in order to be able to use the cluster Ed administers.

A user, Eve, may be a MU that wishes to run her applications on the grid administered by Ed, Eve may access the EGEE website and find the instructions that Ed has posted along with the EGEEConfig.mat file. Eve may add the http location of the configuration to her Configurations Search Path. In an embodiment, live may have no other locations on her Configurations Search Path. Eve may check to make sure she has selected the "parse the Configurations Search Path when I click OK" option, and them may click OK to make a selection. The PCT may access the http location and find EGEEConfig.mat which is programmatically loaded into a configuration UI with the name EGEE-Config.

Eve may see EGEEConfig displayed in the config UI. Eve may review the instructions provided by Ed and may determine that she needs to modify the configuration slightly in order to provide her own user credentials. Eve may inspect EGEEConfig and determine that its parent is the http:// location of the .mat file. Eve may identify the correct properties to change and make these changes directly to her EGEEConfig.

Eve's configurations may be arranged hierarchically (* indicates entries visible in the UI):

```
                        - http://...../EGEEConfig.mat
                          -EGEEConfig *
```

Exemplary embodiments can employ configurations that can be supported by other types of computing environments, such as cloud computing environments. By way of example, a cloud computing environment, such as Amazon's EC2 cloud computing network can be used with configurations disclosed herein.

A user, Arthur, may be a MU who wishes to run his applications on Amazon's EC2. To date, Arthur may have been running his applications using a local configuration (for prototyping) and his organization's jobmanager cluster. Arthur's existing configurations may be represented hierarchically as shown below (* indicates entries available to Arthur in a UI):

```
                        -/public/sharedConfigs/JMConfig.mat
                            -JMConfig*
                              -JMConfigA*
                            -local *
```

Arthur may have developed a simulation that requires significant computing resources. For example, Arthur may estimate that it would take his local cluster at least 5 days to run his simulation. Arthur's organization may discourage situations in which a single user occupies the cluster for more than a few hours. Arthur's work may be time-critical and he may require results of the simulation within 1 day. Arthur decides to ran his simulation using Amazon's EC2, which allows him to lease many more machines.

As part of the setup of a jobmanager cluster on EC2, Arthur is supplied with ArthurEC2Config.mat which is a basic configuration to get started on the cluster. Since Arthur is only going to use this configuration inside a single MATLAB session, he decides to create a temporary configuration for EC2, rather than one that will be visible in future MATLAB sessions. Arthur may import ArthurEC2Config.mat and select the "create temporary configuration" checkbox. Arthur may see ArthurEC2Config displayed in his UI. Arthur may run his simulation on the EC2 using enough machines to produce simulation results within a day.

Exemplary embodiments of the invention support the use of configurations in distributed computing environments that can accommodate direct or indirect coupling between a configuration and a destination, such as a worker. For example, in an embodiment a configuration that identifies a cluster, a job and/or a task may be provided to a scheduler located between a client device and a worker pool. The scheduler may read information from the configuration and may identify particular workers for performing distributed processing on behalf of the client device. In this embodiment, the scheduler may provide an indirect coupling or connection between the configuration and the workers. In another embodiment, the configuration may be sent directly to the worker pool and may include information that identifies particular workers that will perform distributed processing on behalf of the client device. Exemplary embodiments may further include direct or indirect relationships between information in configurations and/or devices, processes, applications, etc., that make use of information in a configuration.

Exemplary embodiments may further allow a device to dynamically download computer-readable instructions for performing methods and/or processing related to the invention. For example, a device can download a data structure containing a hierarchical configuration that can be used to configure a distributed computing environment on behalf of a client.

We claim:
1. A method comprising:
   determining, by an executable process implemented on one or more processors, whether a configuration argument is present,
     the configuration argument being associated with a job or a task to be performed, the configuration argument comprising information for configuring a cluster environment for executing code, and the executing code performing the job or task;

configuring, by the executable process implemented on the one or more processors, the cluster environment based on the configuration argument for executing the code in the cluster environment, the configuring comprising:

submitting, by the executable process implemented on the one or more processors and when the configuration argument is present, the code for performing the job or the task to the cluster environment for execution without requiring modifying the code prior to executing; and executing, locally by the executable process implemented on the one or more processors, the code for performing the job or task, when the configuration argument is not present.

2. The method of claim 1, where the cluster environment includes concurrent computing processors that do not include the one or more processors.

3. The method of claim 1, where the configuration argument includes a configuration name and information for setting up the cluster environment for executing the code.

4. The method of claim 1, where the cluster environment includes a plurality of computing resources separate from the one or more processors.

5. The method of claim 1, where the configuration argument represents a configuration of configurable properties for the cluster environment.

6. The method of claim 1, where the cluster environment is configured to perform batch jobs.

7. The method of claim 1, where determining whether the configuration argument is present includes:

determining whether the configuration argument is present in code for the job or the task.

8. A device comprising:

one or more processors, implementing an executable process, to:

determine whether a configuration argument is present, the configuration argument being associated with a job or a task to be performed, and the configuration argument comprising information for configuring a cluster environment for executing code;

configure the cluster environment based on the configuration argument for executing the code in the duster environment, the one or more processors, when configuring the cluster environment, are to submit, by the executable process implemented on the one or more processors and when the configuration argument is present, the code for performing the job or the task to the cluster environment for execution without requiring modifying the code prior to executing; and execute, locally by the executable process implemented on the one or more processors, the code for performing the job or task, when the configuration argument is not present.

9. The device of claim 8, where the cluster environment includes concurrent computing processors that do not include the one or more processors.

10. The device of claim 8, where the configuration argument includes a configuration name and information for setting up the cluster environment for executing the code.

11. The device of claim 8, where the cluster environment includes a plurality of computing resources separate from the one or more processors.

12. The device of claim 8, where the configuration argument represents a configuration of configurable properties for the cluster environment.

13. The device of claim 8, where the cluster environment is configured to perform batch jobs.

14. The device of claim 8, where the one or more processors, when determining whether the configuration argument is present, are to:

determine whether the configuration argument is present in code for the job or the task.

15. A non-transitory computer-readable medium for storing instructions, the instructions comprising:

a plurality of instructions that, when executed by one or more processors, cause the one or more processors to:

determine whether a configuration argument is present, the configuration argument being associated with a job or a task to he performed, and the configuration argument comprising information for configuring a cluster environment for executing code;

configure the cluster environment based on the configuration argument for executing the code in the cluster environment, the plurality of instructions, that cause the one or more processors to configure the cluster environment, cause the one or more processors to submit, by an executable process implemented on the one or more processors and when the configuration argument is present, the code for performing the job or the task to the cluster environment for execution without requiring modifying the code prior to executing; and execute, locally by the executable process implemented on the one or more processors, the code for performing the job or task, when the configuration argument is not present.

16. The non-transitory computer-readable medium of claim 15, where the cluster environment includes concurrent computing processors that do not include the one or more processors.

17. The non-transitory computer-readable medium of claim 15, where the configuration argument includes a configuration name and information for setting up the cluster environment for executing the code.

18. The non-transitory computer-readable medium of claim 15, where the cluster environment includes a plurality of computing resources separate from the one or more processors.

19. The non-transitory computer-readable medium of claim 15, where the configuration argument represents a configuration of configurable properties for the cluster environment.

20. The non-transitory computer-readable medium of claim 15, where the cluster environment is configured to perform batch jobs.

* * * * *